United States Patent
Wirtschafter et al.

(10) Patent No.: US 11,740,090 B2
(45) Date of Patent: Aug. 29, 2023

(54) ATOM CHIP HAVING TWO CONDUCTIVE STRIPS FOR AN ULTRA-COLD ATOM INERTIAL SENSOR, AND ASSOCIATED SENSOR

(71) Applicant: THALES, Courbevoie (FR)

(72) Inventors: Benjamin Wirtschafter, Palaiseau (FR); Matthieu Dupont-Nivet, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/832,616

(22) Filed: Jun. 4, 2022

(65) Prior Publication Data
US 2022/0397397 A1  Dec. 15, 2022

(30) Foreign Application Priority Data
Jun. 10, 2021  (FR) ..................... 2106122

(51) Int. Cl.
*G01C 19/64* (2006.01)
*H05H 3/02* (2006.01)

(52) U.S. Cl.
CPC ............... *G01C 19/64* (2013.01); *H05H 3/02* (2013.01)

(58) Field of Classification Search
CPC ........ G01C 19/64; G01C 19/005; H05H 3/02; G01P 3/46; G01P 3/48
See application file for complete search history.

(56) References Cited

U.S. PATENT DOCUMENTS

2014/0022534 A1\* 1/2014 Strabley ............... G01P 15/093
356/72
2022/0397396 A1\* 12/2022 Wirtschafter .......... G01C 19/64

FOREIGN PATENT DOCUMENTS

WO  2017/089489 A1  6/2017
WO  2021/228722 A1  11/2021

OTHER PUBLICATIONS

Ammar, et al., "Symmetric microwave potentials for interferometry with thermal atoms on a chip", Phys. Rev., A 91, 053623, May 2015.

\* cited by examiner

*Primary Examiner* — Jonathan M Hansen
(74) *Attorney, Agent, or Firm* — BakerHostetler

(57) ABSTRACT

An atom chip (Ach) for an ultra-cold atom sensor, the atom chip includes a first pair of waveguides, a second pair of waveguides, the projections of the guides along X and the guides along Y' in the plane XY forming, at their intersection, a first parallelogram with a centre O and having a first surface, a first conductive strip and a second conductive strip arranged such that their respective projection in the plane XY forms, at their intersection, a second parallelogram also with a centre O and having a second surface, the strips being designed to be flowed through by DC currents, an intersection between the first and the second surface being greater than or equal to 40% of the first surface.

18 Claims, 31 Drawing Sheets

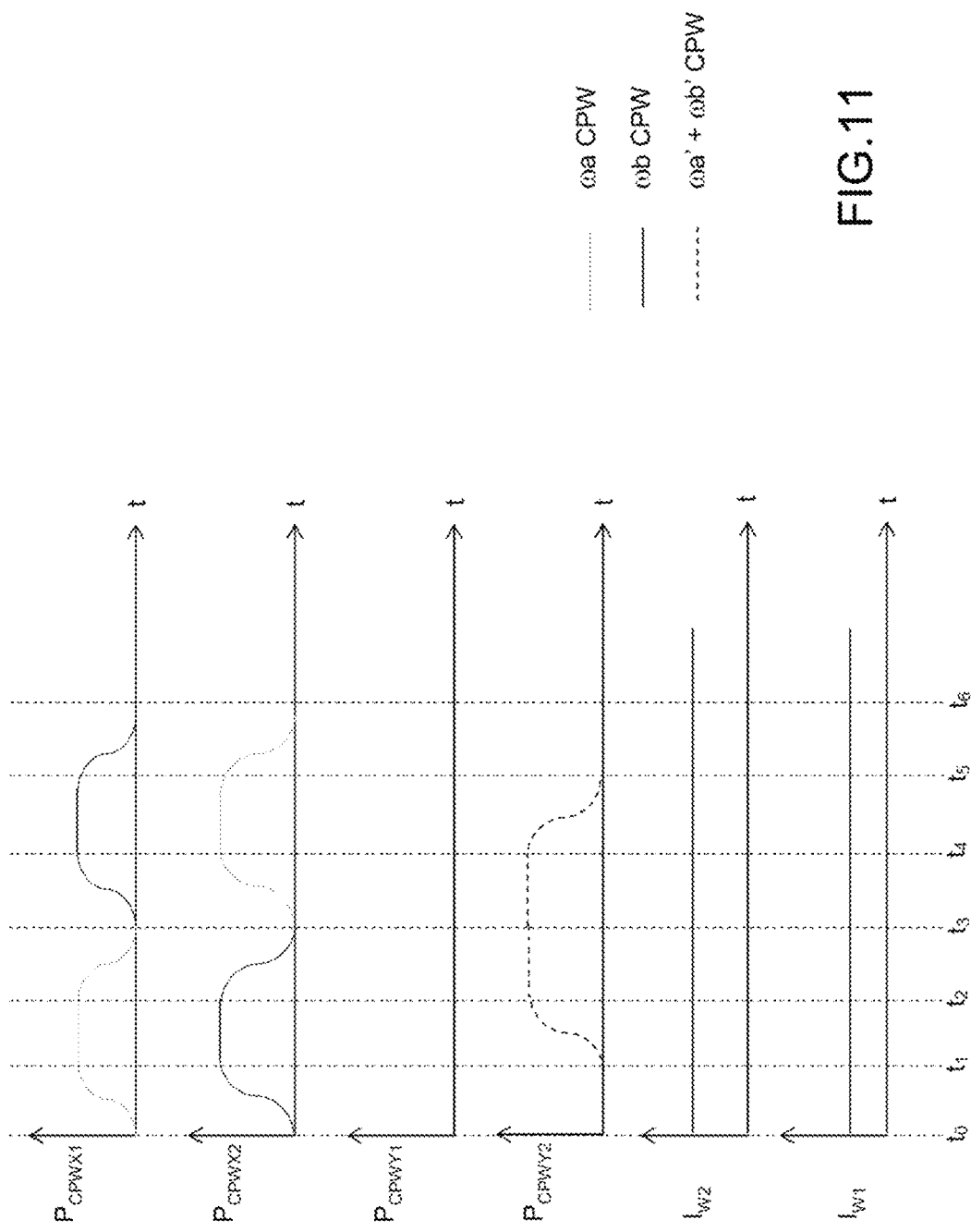

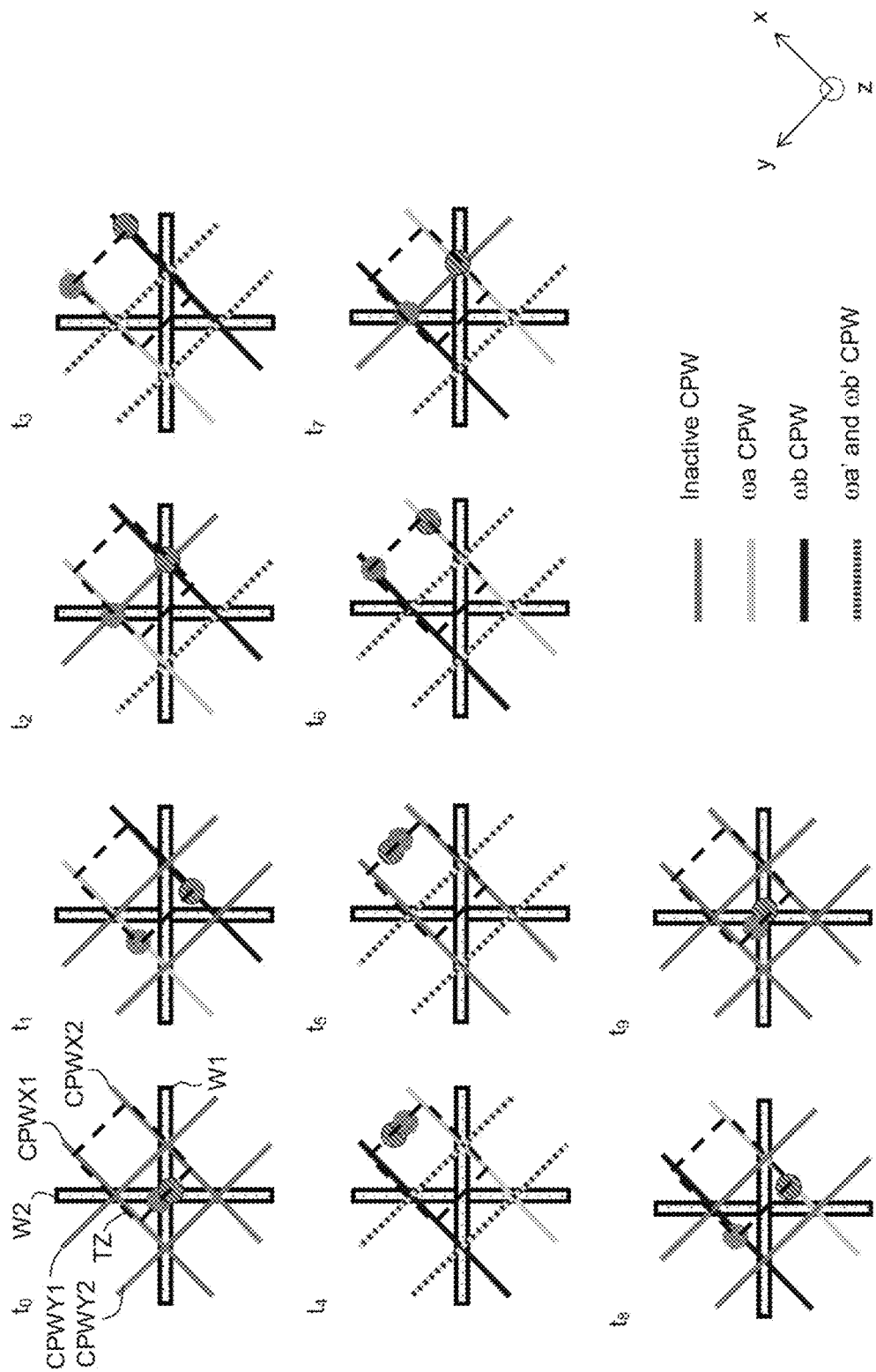
FIG.11bis

ATOM CHIP HAVING TWO CONDUCTIVE STRIPS FOR AN ULTRA-COLD ATOM INERTIAL SENSOR, AND ASSOCIATED SENSOR

CROSS-REFERENCE TO RELATED APPLICATION

This application claims priority to foreign French patent application No. FR 2106122, filed on Jun. 10, 2021, the disclosure of which is incorporated by reference in its entirety.

FIELD OF THE INVENTION

The present invention relates to the field of ultra-cold atom inertial sensors. The invention relates more particularly to chips and the associated sensors for measuring an angular velocity along one or three measurement axes.

BACKGROUND

Document WO2017089489 describes an ultra-cold atom inertial sensor (gyroscope) on a chip using trapped matter waves describing closed paths enclosing an area, the structure and operating principle of which are recalled below.

Rotational measurements on this type of device are performed by utilizing the Sagnac effect. The phase shift $\theta$, induced by the Sagnac effect, between two counter-rotating matter waves in a reference frame rotating at the angular velocity $\Omega$, is given by:

$$\theta = \frac{2Am}{\hbar}\Omega \quad (1)$$

where A is the area contained in the atomic paths, m is the mass of the atoms and h is the reduced Planck constant.

Ultra-cold atoms are defined as atoms whose temperature is below 400 nanokelvin, preferably 300 nanokelvin. The temperature of thermal ultra-cold atoms is, for example for rubidium atoms, between 50 and 400 nanokelvin, and preferably between 100 and 300 nanokelvin.

The principle is that of creating a path that is travelled by two clouds of magnetically trapped atoms in a manner propagating against one another. The creation and the movement of the magnetic trap along the path are achieved using conductive wires and microwave guides using for example the topology illustrated in FIG. 1.

FIG. 1 schematically illustrates an ultra-cold atom 12 chip 1, as well as the path 16 of two clouds of atoms N1 and N2. Part of the surface of the chip 1 forms a measurement plane 13. An axis normal to the measurement plane 13 defines the measurement axis Z, along which a rotational measurement $\Omega z$ is carried out by the gyrometer.

The chip 1 comprises means designed to generate a first ultra-cold atom trap T1 and a second ultra-cold atom trap T2, one trap making it possible to immobilize a cloud of ultra-cold atoms 12 in an internal state different from the other trap, at a predetermined distance h from said measurement plane 13. For example, the trap T1 comprises the atoms in the electron level or state |a> (cloud N1) and the trap T2 comprises atoms in the state |b> (cloud N2). The levels |a> and |b> are spaced by a frequency $\omega_0/2\pi$. For example, in the case of rubidium 87, these are two super-fine levels $|F=1,m_{-F}=-1>$ and $|F=2,m_{-F}=1>$, spaced by around 6.8 GHz.

These means also make it possible to move the clouds along the path 16 located in a plane parallel to the measurement plane 13, at a height h from this plane, as illustrated in FIG. 1.

These means consist of waveguides and conductive wires as described below.

The means comprise a first waveguide CPW1 and a second waveguide CPW2 that are designed to propagate microwaves at angular frequencies $\omega_a$ and $\omega_b$. The waveguides are parallel and positioned symmetrically about an axis Y of the measurement plane. The two waveguides CPW1 and CPW2 are connected to at least one microwave-frequency current or voltage generator. For example, each of the waveguides is produced by depositing three parallel conductive wires so as to produce a coplanar waveguide. In other embodiments, it is possible to use other types of waveguide, in particular waveguides whose manufacture is compatible with deposition or etching micro-manufacturing techniques. It is possible to produce a microstrip line, for example.

The means also comprise conductive wires integrated into the chip 1 and designed to be flowed through by DC currents. The conductive wires are distributed into one conductive wire Wlz along an axis of symmetry Y perpendicular to X and contained within the measurement plane 13, and into a plurality of n conductive wires Wldi, the index i varying from 1 to n, parallel to one another and parallel to the axis X, n being at least equal to 2. In the example of FIG. 1 n=3, i.e. three conductive wires Wld1, Wld2 and Wld3. The wires are arranged so as to define n points of intersection Ci (intersection between Wlz and Wldi) located on the axis Y, here 3 points of intersection C1, C2, C3.

Each conductive wire is linked to one or more current and/or voltage generators, which generators are themselves linked to a processing unit comprising at least one microprocessor. The voltage and/or current generators make it possible to control both DC currents and AC currents in the wires. In particular, DC currents are controlled in the conductive wires.

In the sensor, the atom chip 1 is placed in a vacuum chamber maintained under vacuum, for example, using an ion pump and preferably having magnetic shielding. The vacuum chamber comprises an ultra-cold atom source. The ultra-cold atom source is defined by:

an atom dispenser, for example formed by a heating filament delivering a rubidium vapour;

a primary (optical and/or magnetic) atom trap, making it possible to pre-cool and position a cloud of ultra-cold atoms in the vicinity of the chip, for loading the magnetic traps T1 and T2 that are described later on with atoms.

The vacuum chamber also comprises a magnetic field source, external to the chip 1. It makes it possible to impose a homogeneous and steady magnetic field 20 over a thickness at least of the order of a height h above the measurement plane 13. Advantageously, the direction of the homogeneous magnetic field is parallel to the measurement plane.

In FIG. 1, the path 16 in dashed lines illustrates the path of the clouds of ultra-cold atoms 12. This closed path defines an area denoted A. A distance h separates the plane of the path 16 and the measurement plane 13 of the chip. Preferably, h is between 500 nm and 1 mm, and preferably between 5 μm and 500 μm.

FIG. 2 illustrates the geometry of the guides and wires of the atom chip as well as the traps T1 and T2. The generation and operating principle of these traps are described in the publication by Ammar et al. "Symmetric microwave potential for interferometry with thermal atoms on a chip" Phys. Rev. A91, 053623 (2015).

The specific arrangement of the conductive wires and waveguides, in combination with the homogeneous magnetic field source, makes it possible to easily obtain two traps T1 and T2 as illustrated in part a) of FIG. 2. Each trap T1 and T2 has a non-zero and identical value of the minimum VO and an identical curvature, a condition needed for the sensor to work. Specifically, as explained further on, when a DC current is applied to at least two conductive wires of a point of intersection, the potential minimum is located at the vertical of this point of intersection. When a microwave power is then sent into the waveguides, the central minimum transforms into two minima on either side of the initial minimum in the direction of the waveguides. If the initial minimum is not situated strictly at an equal distance from the two waveguides, the two potential minima that are created will not have precisely the same value of the minimum VO and the same curvature.

Part c) of FIG. 2 illustrates the arrangement of the conductive wires defining the initial point of intersection C1 and the waveguides (plan view). Part b) of FIG. 2 describes the corresponding arrangement of the conductive wires and waveguides printed on a chip in a profile view, in cross section along the conductive wire Wld1 that intersects the conductive wire Wlz along the axis of symmetry Y. The waveguides CPW1 and CPW2 are coplanar waveguides situated on a first level N1. The insulating layer 18 advantageously makes it possible to flatten the measurement plane. The material of the layer of electrical insulator may be for example silicon dioxide, silicon nitride or benzocyclobutene. A conductive material is used to manufacture the conductive wires, for example gold, and is deposited on a substrate 15, forming a second level N2. The substrate may be made for example of silicon, of aluminium nitride or of silicon carbide.

Part a) shows the symmetrical separation of ultra-cold atoms, specific to the internal state of said ultra-cold atoms, and more precisely the variations in potential as a function of the axis X of the chip 1.

The curve "a" in black shows a potential well corresponding to the combination of the homogeneous magnetic field and of the field created by two secant conductive wires, the wire Wlz flowed through by the current $I_Z$ and the wire Wld1 flowed through by the current Id1. This results in a local potential well forming an atom trap T in three dimensions, a DC magnetic trap. A cloud of ultra-cold atoms is able to be trapped and cooled there.

The curve "b" in light grey dashed lines schematically shows the potential created by the transmission of microwaves at the frequency $\omega_b$ in the waveguide CPW1. The field emitted by the passage of microwaves at the frequency $\omega_b$ makes it possible to modify the energy of the ultra-cold atoms and to move the atoms with internal states |b>. The curve "e" in a light grey unbroken line illustrates the potential seen by the internal states |b> due to the contributions of the potentials illustrated by the curve "a" and by the curve "b". The curve "e" exhibits a local potential minimum that makes it possible to locally trap a cloud of ultra-cold atoms with internal states |b>. The microwave field emitted at $\omega_b$ in CPW1 thus "pushes" the atoms in the state |b> from the side opposite the waveguide CPW1.

Similarly, the curve "d" in dark grey dashed lines schematically shows the potential created by the transmission of microwaves at the frequency $\omega_a$ in the waveguide CPW2. The field emitted by the passage of microwaves at the frequency $\omega_a$ makes it possible to modify the energy of the ultra-cold atoms and to move the atoms with internal states |a>. The curve "c" in a dark grey unbroken line illustrates the potential seen by the atoms with internal states |a> due to the contributions of the potentials illustrated by the curve "a" and by the curve "d". The curve "c" exhibits a local energy minimum that makes it possible to locally trap a cloud of ultra-cold atoms with internal states |a>. The microwave field emitted at ωa in CPW2 thus "pushes" the atoms in the state |a> from the side opposite the waveguide CPW2.

The combination of a DC magnetic trap (created by the DC currents in the wires and the homogeneous field 20) and of a microwave field creates what is called a "dressed" trap. "Dressed" is understood to mean a trap created at least partially by an oscillating microwave, radiofrequency or optical field. The changes in the microwave fields (power, frequency and guide in which they propagate) make it possible to move this dressed trap and therefore to move the atoms. The DC magnetic trap is represented in FIG. 2 by the curve a. The microwave field at ωa is represented in FIG. 2 by the curve d and the microwave field at ωb is represented in FIG. 2 by the curve b. The dressed trap T1 (combination of curves a and d) for the state |a> is represented by the curve c and the dressed trap T2 (combination of curves a and b) for the state |b> is represented by the curve e.

The clouds of ultra-cold atoms with internal states |a> and |b> may be separated and trapped symmetrically about the axis of symmetry Y by simultaneously imposing the propagation of waves of frequency $\omega_a$ in CPW2 and ωb in CPW1. To obtain two traps whose minima have the same value VO and whose curvatures have the same value, it is vital for the point of intersection C1 to be positioned at an equal distance from CPW1 and CPW2, on the axis of symmetry Y.

FIG. 3 illustrates the principle of generating the path 16. Part a) of FIG. 3 schematically shows a sequence of the movement of each of the clouds of ultra-cold atoms at characteristic times $t_0$ to $t_8$. Part b) illustrates, in a complementary manner, a sequence of the various currents applied to the conductive wires, the powers applied to the waveguides and the frequencies imposed on the waveguides, for times corresponding to those of part a).

In the sequence shown in FIG. 3, the current $I_Z$, not shown, flowing in Wlz is steady, at a constant value. In part b), the values of the currents, of the powers and of the frequencies are arbitrary. The ordinate 6 frequency corresponds to a frequency variation expressed in arbitrary units, around an average value of the frequency. The currents flowing through the conductive wires may be between 100 µA and 10 A, and the angular frequencies injected into the waveguides may be between 6.6 GHz and 7 GHz if rubidium atoms are used.

In a step A0, there is a phase of preparing the atoms. This involves generating a cloud of ultra-cold atoms 12, including phases of dispensing said atoms, of cooling said atoms, of initializing said atoms in at least one internal state |a> and of trapping a cloud of said ultra-cold atoms in a local potential minimum, at a distance h from the measurement plane (trap T, curve "a" of FIG. 2 part a)). The height h is other than 0 since the homogeneous magnetic field 20 is non-zero. The trapping is achieved through the flow of DC currents in the wire Wlz and in one of the wires Wldi, the point of intersection of these two wires defining the starting point (here C1 with Wld1). At the same time, a bias magnetic field 20 is applied parallel to the plane of the atom chip, which is superposed on the magnetic field created by the previous two wires. The cloud of atoms is then trapped vertical to C1, intersection of the wires Wlz and Wld1.

In a step B0, the internal states are initialized by coherently superposing said ultra-cold atoms between said state |a> and an internal state |b> through a first pulse π/2. This pulse may be produced using a laser, a microwave emission, or more generally using a method emitting waves at a suitable transition frequency. The currents $I_z$ and $I_{d1}$ are imposed respectively on the conductive wires Wlz and Wld1. The two internal states |a> and |b> are superposed coherently and spatially plumb to the point of intersection C1. This corresponds to the time t0 for which the two clouds are in one and the same trap T.

The wave function is then:

$$\frac{|a> + |b>}{\sqrt{2}} \quad (2)$$

In a step C0, a cloud of atoms with an internal state |a> in a trap T1 is spatially separated from a cloud of atoms with an internal state |b> in another trap T2 and the traps are moved in opposing directions along a closed path 16 contained within a plane perpendicular to the measurement axis Z. The cloud of atoms with internal states |a> is symbolized by a disc with a dark texture and the cloud of atoms with internal states |b> is symbolized by a disc with a lighter texture. This step is performed from $t_0$ to $t_8$.

Between t0 and t1, the microwave power injected into the waveguides CPW1 and CPW2 changes gradually from 0 to its maximum value. An angular frequency $\omega_a$ is sent into the waveguide CPW1 and an angular frequency $\omega_b$ is sent into the waveguide CPW2, thereby making it possible to separate the two clouds with different internal states onto either side of the axis of symmetry Y, by a distance d, to the positions depicted schematically in $t_1$. The ultra-cold atom trap T described above at the time $t_0$ is then transformed into two ultra-cold atom traps T1 and T2, each trap making it possible to immobilize a cloud of ultra-cold atoms with internal states different from the other trap (in this case with internal states |a> in one of the traps, for example T1, and with internal states |b> in the other trap T2, as described in part a) of FIG. 2).

A point of intersection Ci corresponds to the intersection of the wire Wlz with the wire Wldi.

Between $t_1$ and $t_2$, the current $I_{d1}$ is gradually cut off and $I_{d2}$ is gradually brought to its maximum value (the time interval separating $t_1$ and $t_2$ is typically of the order of 10 ms and may be between 0.1 ms and 100 ms): the two traps T1 and T2 are moved to the right to the positions depicted schematically in $t_2$.

Between $t_2$ and $t_3$, the current $I_{d2}$ is gradually cut off and $I_{d3}$ is gradually brought to its maximum value: the two traps are moved to the right to the positions depicted schematically in $t_3$.

Between $t_3$ and $t_4$, the microwave power is gradually cut off: the two traps are brought to the same location on the chip, outlined schematically in $t_4$.

At $t_4$, the angular frequencies of the two microwave guides are modified: the angular frequency $\omega_b$ is imposed in CPW1 and the angular frequency $\omega_a$ is imposed in CPW2.

Between $t_4$ and $t_5$, the power in the two waveguides changes gradually from 0 to its maximum value: the traps are separated in the vertical direction, as depicted schematically in the Figure $t_5$.

Between $t_5$ and $t_6$, the current $I_{d3}$ is gradually cut off and $I_{d2}$ is gradually brought to its maximum value: the two traps T1 and T2 are moved to the left to the positions depicted schematically in $t_6$.

Between $t_6$ and $t_7$, the current $I_{d2}$ is gradually cut off and $I_{d1}$ is gradually brought to its maximum value: the two traps are moved to the left to the positions depicted schematically in $t_7$. This operation may be repeated multiple times with further first conductive wires so as to increase the area contained within the path 16.

Between $t_7$ and $t_8$, the microwave power in the waveguides is gradually cut off. The two traps T1 and T2 move until merging into a single trap situated at the starting point depicted schematically in t0.

DC currents are thus applied to the two wires corresponding to the initial point of intersection C1, and over time these currents are applied successively to the various points of intersection Ci situated on the axis of symmetry, while simultaneously applying a microwave power to the waveguides.

During step C0, the DC currents applied to the various wires Widi vary continuously (increase and decrease) between 0 and a maximum value Idimax (normalized at 1 in FIG. 3), while the magnetic field 20 and the current $I_z$ remain constant during the sequence. Throughout the sequence A0, B0 and C0 the two traps T1 and T2 remain at the altitude h.

The two traps T1 and T2 move in the direction of "activation" of the points of intersection: from the point of intersection C1 to the point of intersection Cn. The return is made by reversing the microwave frequencies and by activating the DC currents successively in the wires corresponding to the various points of intersection by going through them from Cn to C1.

The traps are thus made to run through the closed path 16.

The closed path 16 of the atoms then contains an area A, and the atomic wave function is therefore:

$$\frac{|a> + \exp(i\varphi)|b>}{\sqrt{2}} \quad (3)$$

Where:

$$\varphi = \omega_0 t + \frac{m}{\hbar}\Omega_Z A \quad (4)$$

$\Omega_z$ is the angular rotational velocity along the axis Z and $\omega_0$ is the angular frequency corresponding to the electron transition energy between |a> and |b>.

In a step D0, the internal states |a> and |b> are recombined by applying a second pulse π/2 to the ultra-cold atoms, which transfers the phase difference to the populations of the two atomic levels:

$$p_a = \frac{1}{2}[1 + \cos(\varphi - \omega t)] \quad (5)$$

$$p_b = \frac{1}{2}[1 - \cos(\varphi - \omega t)] \quad (6)$$

where ω is the angular frequency of the pulse π/2.

The pulses π/2 may be sent to the atoms via the microwave guides or via a separate microwave emitter.

The number of atoms in an internal state chosen from at least |a> and |b> is then measured. This measurement may be performed for example by laser absorption while sampling the resonance between the angular frequency specific to an internal state and that of the laser.

Lastly, in a step E0, the Sagnac phase of the ultra-cold atoms is determined and the rotational velocity of the sensor along the axis Z is calculated.

Measuring at least one population of atoms in one of the states |a> or b> makes it possible to determine the Sagnac phase, for example for the internal state |a> by considering equation (5), and then the rotational velocity $\Omega_z$ with equation (1).

"Phase of free evolution" is the name given to that part of the interferometry sequence situated between the two pulses π/2, i.e. step C0.

The traps may be made to run through this path N times before measuring the Sagnac phase, and a phase that will potentially be N times higher may thus be measured.

The measurement thus takes place by moving the minimum of the magnetic field containing the two dressed traps (trap created at least partially by the microwave oscillating field) by varying the DC currents in a certain way in the matrix of wires present on the chip (gradual activation and gradual deactivation of the DC wires in a cross), such that the greatest possible area is obtained.

In order to implement the method described above, the ultra-cold atom sensor for measuring a rotational velocity $\Omega_z$ comprises:
an atom chip 1 as described above, with the waveguides and the conductive wires,
an atom source for generating the cloud of ultra-cold atoms close to the measurement plane 13 of the atom chip,
a generator for generating the homogeneous magnetic field 20
at least one processor, at least one DC current or voltage generator designed to control electric currents in the conductive wires, and at least one microwave current or voltage generator connected to the waveguides,
an optical intensity detection system designed to measure at least one population of ultra-cold atoms in an internal state, this measurement making it possible to determine the Sagnac phase and the rotational velocity $\Omega_z$.

This sensor described above and in document WO2017089489 makes it possible, from a path contained within a plane parallel to the measurement plane 13, only to measure rotational velocity along the axis Z perpendicular to the plane of the chip. In order to be able to measure the rotational velocity along three axes, it is necessary to have 3 sensors of this type, this being expensive, burdensome and complex to implement, particularly for the respective positioning of the three axes (adjustment and their orthogonality), this adjustment exhibiting temporal drift that decreases the accuracy of the assembly. In addition, measuring Ωz requires a chip with multiple parallel conductive wires Wldi. The presence of these multiple wires, to which various DC voltages are successively applied, complicates the chip and the sequence of separating/moving the traps.

SUMMARY OF THE INVENTION

One aim of the present invention is to rectify the above-mentioned drawbacks by proposing a simplified atom chip and sensors based on this chip, capable of performing a rotational velocity measurement along the axis Z, but also a rotational velocity measurement along three perpendicular axes X, Y and Z. In addition, a variant of a chip and an associated sensor exhibits increased sensitivity.

According to a first aspect, a subject of the present invention is an atom chip for an ultra-cold atom sensor, comprising a measurement plane XY defined by an axis X and an axis Y that are orthogonal, said measurement plane being normal to an axis Z, the atom chip comprising:
a first pair of waveguides consisting of a first and a second waveguide that are coplanar, parallel to one another and arranged symmetrically on either side of an axis whose projection in the plane XY is along the axis X, called guides along X,
a second pair of waveguides consisting of a first and a second waveguide that are coplanar, parallel to one another and arranged symmetrically on either side of an axis whose projection in the plane XY is along an axis Y' different from the axis X, called guides along Y',
the guides along X being electrically insulated from the guides along Y';
the projections of the guides along X and the guides along Y' in the plane XY forming, at their intersection, a first parallelogram with a centre O and having a first surface,
a first conductive strip and a second conductive strip arranged such that their respective projection in the plane XY forms, at their intersection, a second parallelogram also with a centre O and having a second surface, said strips being designed to be flowed through by DC currents,
an intersection between the first and the second surface being greater than or equal to 40% of the first surface.

According to one embodiment, the first and the second strip are respectively oriented along a first and a second diagonal of said first parallelogram.

According to one embodiment, the first and the second strip are perpendicular to one another.

According to one embodiment, the second pair of waveguides is perpendicular to said first pair of waveguides, the axis Y' then being coincident with the axis Y.

According to one embodiment, the strips are perpendicular to one another and said pairs of waveguides are perpendicular to one another and oriented at 45° from said strips.

According to one variant, the chip according to the invention furthermore comprises:
at least one additional pair of guides along X that are further away from the axis X than the first pair, and
at least one additional pair of guides along Y' that are further away from the axis Y' than the second pair.

According to another aspect, the invention relates to an ultra-cold atom sensor allowing a rotational velocity measurement along at least the axis Z comprising:
an atom chip according to the invention placed in a vacuum chamber,
an atom source designed to generate a cloud of ultra-cold atoms close to said plane XY of said atom chip;
said ultra-cold atoms having, in the phase of initializing the implementation of the sensor, a superposition of internal states |a> and |b>
a generator for generating a homogeneous magnetic field,
at least one processor, at least one DC current or voltage generator connected to said strips, and at least one microwave current or voltage generator connected to said waveguides,
said waveguides and said strips being configured, in the phase of implementing the sensor, so as to:
modify the energy of said ultra-cold atoms so as to create a potential minimum for the ultra-cold atoms in the internal state |a> and a potential minimum for the ultra-cold atoms in the internal state |b>, thus forming a first (T1) and second (T2) ultra-cold atom trap, a trap making it possible to immobilize a cloud of ultra-cold atoms (12) in an internal state different from the other trap, at a controlled distance from said measurement plane, and spatially separate the two traps and move said traps along at least one first closed path contained within a plane perpendicular to Z, and travelled in one direction by the ultra-cold atoms of the first trap and in the opposite direction by the ultra-cold atoms of the second trap, the sensor furthermore comprising an optical intensity detection system designed to measure at least one population of said ultra-cold atoms in one said internal state.

According to one embodiment, in the ultra-cold atom sensor according to the invention, in the sequence of separating and moving said traps:

the guides along X of the first pair are passed through simultaneously by microwave signals with angular frequencies $\omega a$ or $\omega b$, at certain times called first set of times, at least one of the guides along Y' of the second pair is passed through by a microwave signal formed by the superposition of a microwave signal at an angular frequency $\omega a'$ and a microwave signal with an angular frequency $\omega b'$, at certain times called second set of times having times in common with the first set of times, the strips each being flowed through by a constant current during the separation, the movement and the recombination of said traps, where applicable the guides along X of said at least one additional pair are also passed through simultaneously by microwave signals with angular frequencies $\omega a$ or $\omega b$, at certain times different from the first set of times.

According to one embodiment, in the ultra-cold atom sensor according to the invention, in the sequence of separating and moving said traps:

the guides along Y' of the second pair are passed through simultaneously by microwave signals with angular frequencies $\omega a'$ or $\omega b'$, at certain times called first set of times, at least one of the guides along X of the first pair is passed through by a microwave signal formed by the superposition of a microwave signal at an angular frequency $\omega a$ and a microwave signal with an angular frequency $\omega b$, at certain times called second set of times having times in common with the first set of times, the first and second strips each being flowed through by a constant current during the separation, the movement and the recombination of said traps, where applicable the guides along Y' of the at least one additional pair are also passed through simultaneously by microwave signals with angular frequencies $\omega a'$ or $\omega b'$, at certain times different from the first set of times.

According to one embodiment, the ultra-cold atom sensor (20) furthermore allows a rotational velocity measurement along the axes X and Y'. In this sensor, the waveguides and the strips are furthermore configured so as to move said traps along a second closed path contained within a plane perpendicular to X, during the rotational velocity measurement along the axis X, to move said traps along a third closed path contained within a plane perpendicular to Y', during the rotational velocity measurement along the axis Y', said closed paths being travelled in one direction by the ultra-cold atoms of the first trap and in the opposite direction by the ultra-cold atoms of the second trap, the second and third paths each comprising at least one first portion located at a first height from the plane XY and a second portion located at a second height strictly greater than the first height.

According to one embodiment of the sensor according to the invention, when implementing the measurement of the rotational velocity along the axis X by generating the second closed path, the guides along X of the first pair are passed through simultaneously by microwave signals with angular frequencies $\omega a$ or $\omega b$, at certain times called third set of times, the guides along Y' of the second pair are simultaneously passed through by a microwave signal formed by the superposition of a microwave signal at an angular frequency $\omega a'$ and a microwave signal with an angular frequency $\omega b'$ in order to switch from the first height to the second height, at certain times called fourth set of times having times in common with the third set of times, the first and second strips are each flowed through by a constant current during the separation, the movement and the recombination of said traps, where applicable the guides along X of said at least one additional pair are also passed through simultaneously by microwave signals with angular frequencies $\omega a$ or $\omega b$, at certain times different from the third set of times.

According to one embodiment of the sensor according to the invention, when implementing the measurement of the rotational velocity along the axis Y' by generating the third closed path, the guides along Y' of the second pair are passed through simultaneously by microwave signals with angular frequencies $\omega a'$ or $\omega b'$, at certain times called third set of times, the waveguides along X of the first pair are simultaneously passed through by a microwave signal formed by the superposition of a microwave signal at an angular frequency $\omega a$ and a microwave signal with an angular frequency $\omega b$ in order to switch from the first height to the second height, at certain times called fourth set of times having times in common with the third set of times, the first and second strips are each flowed through by a constant current during the separation, the movement and the recombination of said traps, where applicable the guides along Y' of said at least one additional pair are also passed through simultaneously by microwave signals with angular frequencies $\omega a'$ or $\omega b'$, at certain times different from the third set of times.

According to another aspect, the invention relates to a matrix atom chip comprising:

a first set of N first conductive strips indexed n and a second set of M second conductive strips indexed m that are perpendicular to one another and respectively form N rows and M columns of a matrix, the strips of the first set being electrically insulated from the strips of the second set, axes Xk indexed k are defined along first diagonals of the matrix and axes Yl indexed l are defined along second diagonals perpendicular to the first diagonals, the matrix chip also comprising first pairs of waveguides along each axis Xk and second pairs of waveguides along each axis Yl, each pixel of the matrix forming an elementary chip.

According to one embodiment, the matrix atom chip according to the invention furthermore comprises:

for each axis Xk, at least one additional pair of guides along Xk that are further away from the axis Xk than the first pair, for each axis Yl, at least one additional pair of guides along Yl that are further away from the axis Yl than the second pair.

The invention also relates to an ultra-cold atom sensor comprising:

a matrix atom chip according to the invention, an atom source designed to generate a cloud of ultra-cold atoms close to said plane XY of said atom chip, a generator for generating a homogeneous magnetic field, at least one processor, at least one DC current or voltage generator designed to control electric currents in said strips, and at least one microwave current or voltage generator connected to said waveguides, an optical intensity detection system, the sensor being designed to measure, according to requirements and in a reconfigurable manner, at least one acceleration and/or rotational velocity in a direction corresponding to that of the axis Xk and/or the axis Yl, and/or a rotational velocity along the axis Z, from said elementary chips.

According to a last aspect, the invention relates to a method for measuring a rotational velocity about at least one axis called measurement axis, using an ultra-cold atom sensor comprising an atom chip, said atom chip being placed in a vacuum chamber and comprising a measurement plane XY defined by an axis X and an axis Y that are orthogonal, said measurement plane being normal to an axis Z, the atom chip comprising:

a first pair of waveguides consisting of a first and a second waveguide that are coplanar, parallel to one another and arranged symmetrically on either side of an axis whose projection in the plane XY is along the axis X, called guides along X, a second pair of waveguides consisting of a first and a second waveguide that are coplanar, parallel to one another and arranged symmetrically on either side of an axis whose projection in the plane XY is along an axis Y', called guides along Y', the guides along X being electrically insulated from the guides along Y';

the projections of the guides along X and the guides along Y' in the plane XY forming, at their intersection, a first parallelogram with a centre O and having a first surface, a first conductive strip and a second conductive strip arranged such that their respective projection in the plane XY forms, at their intersection, a second parallelogram also with a centre O and having a second surface, said strips being designed to be flowed through by DC currents, an intersection between the first and the second surface being greater than or equal to 40% of the first surface, the method comprising, for measuring the rotational velocity along Z, the steps of:

A Generating a cloud of said ultra-cold atoms, including phases of dispersing said atoms, of cooling said atoms, of initializing said atoms in at least one internal state |a> and of trapping a cloud of said ultra-cold atoms in a local potential minimum, said trapping being achieved through the flow of DC currents through the first and the second strip, B Initializing the internal states by coherently superposing said ultra-cold atoms between said state |a> and an internal state |b> different from |a> through a first pulse π/2;

C Spatially separating a cloud of said atoms with said internal state |a> in a trap from a cloud of said atoms with said internal state |b> in another trap, and moving said traps in opposing directions along a closed path contained within a plane perpendicular to the measurement axis and initialized from the point O:

by applying a predetermined microwave-frequency current or voltage to said waveguides in a predetermined sequence, and by applying a constant DC current or voltage value to the first and second strips, D Recombining said internal states |a> and |b> by applying a second pulse π/2 to said ultra-cold atoms and then measuring the number of atoms in an internal state chosen from among at least |a> and |b>;

E Determining the Sagnac phase of said ultra-cold atoms and calculating the rotational velocity of said sensor along said measurement axis.

According to one embodiment, in the measurement method according to the invention, in order to measure a rotational velocity about the axis Z, during step C, the sequence includes applying, at certain times, a microwave signal formed by the superposition of a microwave signal at an angular frequency ωa and a microwave signal with an angular frequency ωb to one of the guides along X of the first pair, or applying a microwave signal formed by the superposition of a microwave signal at an angular frequency ωa' and a microwave signal with an angular frequency ωb' to one of the guides along Y' of the second pair.

According to one embodiment of the measurement method according to the invention, in order to measure a rotational velocity about the axis X or the axis Y', during step C, the sequence includes:

in order to measure the rotational velocity about the axis X, applying, at certain times, a microwave signal formed by the superposition of a microwave signal at an angular frequency ωa and a microwave signal with an angular frequency ωb, simultaneously to the two guides along X of the first pair, in order to measure the rotational velocity about the axis Y', applying, at certain times, a microwave signal formed by the superposition of a microwave signal at an angular frequency ωa' and a microwave signal with an angular frequency ωb', simultaneously to the two guides along Y' of the second pair.

The following description gives a number of exemplary embodiments of the device of the invention: these examples do not limit the scope of the invention. These exemplary embodiments not only have features that are essential to the invention but also additional features specific to the embodiments in question.

BRIEF DESCRIPTION OF THE DRAWINGS

The invention will be better understood and other features, aims and advantages thereof will become apparent from the detailed description which follows and with reference to the appended drawings, which are given by way of non-limiting example and in which:

FIG. 11 illustrates the timing diagram associated with the movements of the clouds from FIG. 10.

FIG. 11bis illustrates one example of a path TZ according to one option from the first example.

DETAILED DESCRIPTION

Figure 4:
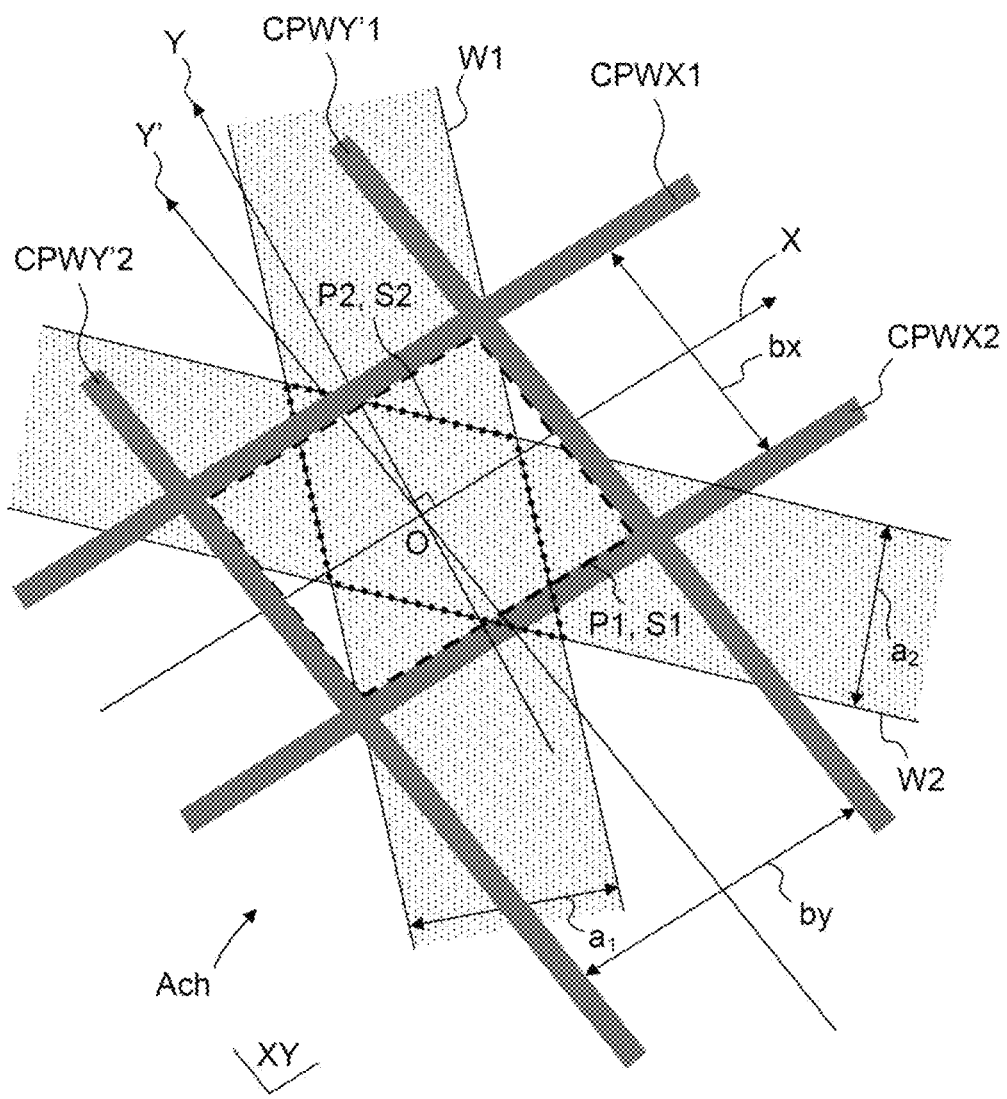
FIG. 4 illustrates an atom chip according to the invention.

According to a first aspect, the invention relates to an atom chip Ach for an ultra-cold atom sensor as illustrated in FIG. 4. The surface of the chip defines a plane XY called measurement plane defined by an axis X and an axis Y that are perpendicular to one another, the plane XY being normal to an axis Z. The axes XYZ define an orthonormal reference system.

The atom chip Ach comprises a first pair of waveguides consisting of a first waveguide CPWX1 and a second waveguide CPWX2 that are coplanar, parallel to one another and arranged symmetrically on either side of an axis whose projection in the plane XY is along the axis X. The waveguides that are parallel to X are called guides along X.

The atom chip Ach also comprises a second pair of waveguides consisting of a first waveguide CPWY'1 and a second waveguide CPWY'2 that are coplanar, parallel to one another and arranged symmetrically on either side of an axis whose projection in the plane XY is along an axis Y' different from the axis X. The waveguides that are parallel to Y' are called guides along Y'.

The guides along X are electrically insulated from the guides along Y'. They are preferably arranged on a different level of the chip. In the non-limiting hypothesis in which the guides along X occupy the level corresponding to the surface XY, the projection of the axis X in the plane XY corresponds to this axis X, while the axis of symmetry of the two waveguides CPWY'1 and CPWY'2 is located in the plane of another level. It is thus actually the projection of this axis of symmetry in the plane XY, called Y', which is situated in the plane XY. The axis Y' is different from X, the angle between X and Y' is greater than or equal to 30° and less than or equal to 150°. The projections of the guides along X and the guides along Y' in the plane XY form a first parallelogram P1 with a centre O, with an internal surface called first surface S1. Internal surface is the name given to the surface defined by the internal edges of the waveguides.

The chip also comprises a first conductive strip W1 and a second conductive strip W2, arranged such that their respective projection in the plane XY forms, at their intersection, a second parallelogram P2 also with a centre O and having a surface of intersection called second surface S2. The fact that the two parallelograms share one and the same centre O is dictated by symmetry considerations for generating potential minima for the atom traps. The angle between the two strips is greater than or equal to 20°. The strips are designed to be flowed through by DC currents. The two strips W1 and W2 may be in electrical contact with one another and deposited on one and the same level of the chip, or electrically insulated from one another. In these cases, the two wires W1 and W2 either occupy the same level and are separated by an insulating layer at least at their intersection, or occupy two different levels, like the waveguides. The various levels form a stack arranged on a substrate. The atom chip according to the invention thus comprises a substrate and the stack. According to a first example, the various guides and strips (elements) are successively deposited on the substrate and separated by insulating layers if need be. According to a second example, the substrate is etched, one of the elements is inserted, and then a material identical to that of the substrate is deposited and then etched, and so on. In this last case, the various elements are therefore integrated into one and the same material.

For greater clarity in the upcoming figures, the guides and the strips are shown in the plane XY.

The waveguides and the conductive strips are of a similar nature to those described in document WO2017089489. Typically, the strips and the guides are made of gold or copper, insulated by a layer of material chosen from among AlN, $SiO_2$, $Si_3N_4$, the layers being deposited on a substrate Sub made of AlN or silicon or $SiO_2$ or SiC.

To make the chip operate so as to measure a rotational velocity $\Omega z$ along the axis Z with only these two strips, the inventors have demonstrated that it was necessary for the intersection between the first and the second surface to be greater than or equal to 40%, preferably 60%, of the first surface S1:

$$S1 \cap S2 \geq 40\% \text{ of } S1 \qquad (1)$$

The case of a surface S2 of the second parallelogram P2 completely covering the surface S1 of P1 and exceeding it also allows good operation of the chip.

Let a1 be the width of W1 and a2 be the width of W2, bx be the distance between the two guides along X and by' be the distance between the two guides along Y', preferably, and in addition to the condition on the surfaces this gives:

$$a_{min} = \min(a1, a2); a_{max} = \max(a1, a2)$$

$$a_{min} \leq bx \leq 4 \cdot a_{max}/3 \text{ and } a_{min} \leq by \leq 4 \cdot a_{max}/3$$

Typically, a1 and a2 are between 20 and 200 μm.

The atom chip Ach according to the invention differs from the chip described in document WO2017089489 firstly through the presence of 4 waveguides (rather than two), through the number of wires (just 2) and through the specific arrangement of these two conductive wires with respect to the 4 waveguides.

The atom chip according to the invention adopts the geometry of the atom chip described in document FR2004743, not yet published to date, with the difference that the thin conductive wires from FR2004743 have been replaced by strips having a certain width such that the surface of intersection of the two strips S2 substantially covers or even completely covers or exceeds the inter-guide surface S1 (see condition (1)). The name strips W1 and W2 stems from the fact that their respective widths e1 and e2 are at least an order of magnitude (factor 10) lower than their respective widths a1 and a2.

Figure 5:
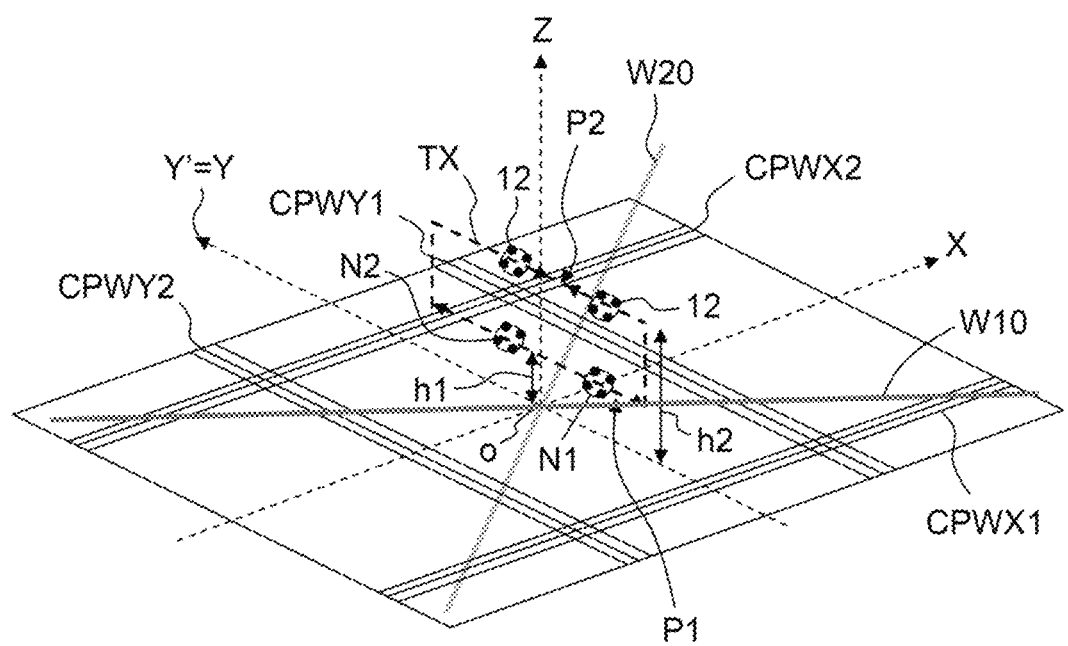
FIG. 5 illustrates one example of a closed path TX travelled by the clouds of atoms for a rotational velocity measurement along the axis X, the path being situated in a plane perpendicular to the axis X.
Figure 6:
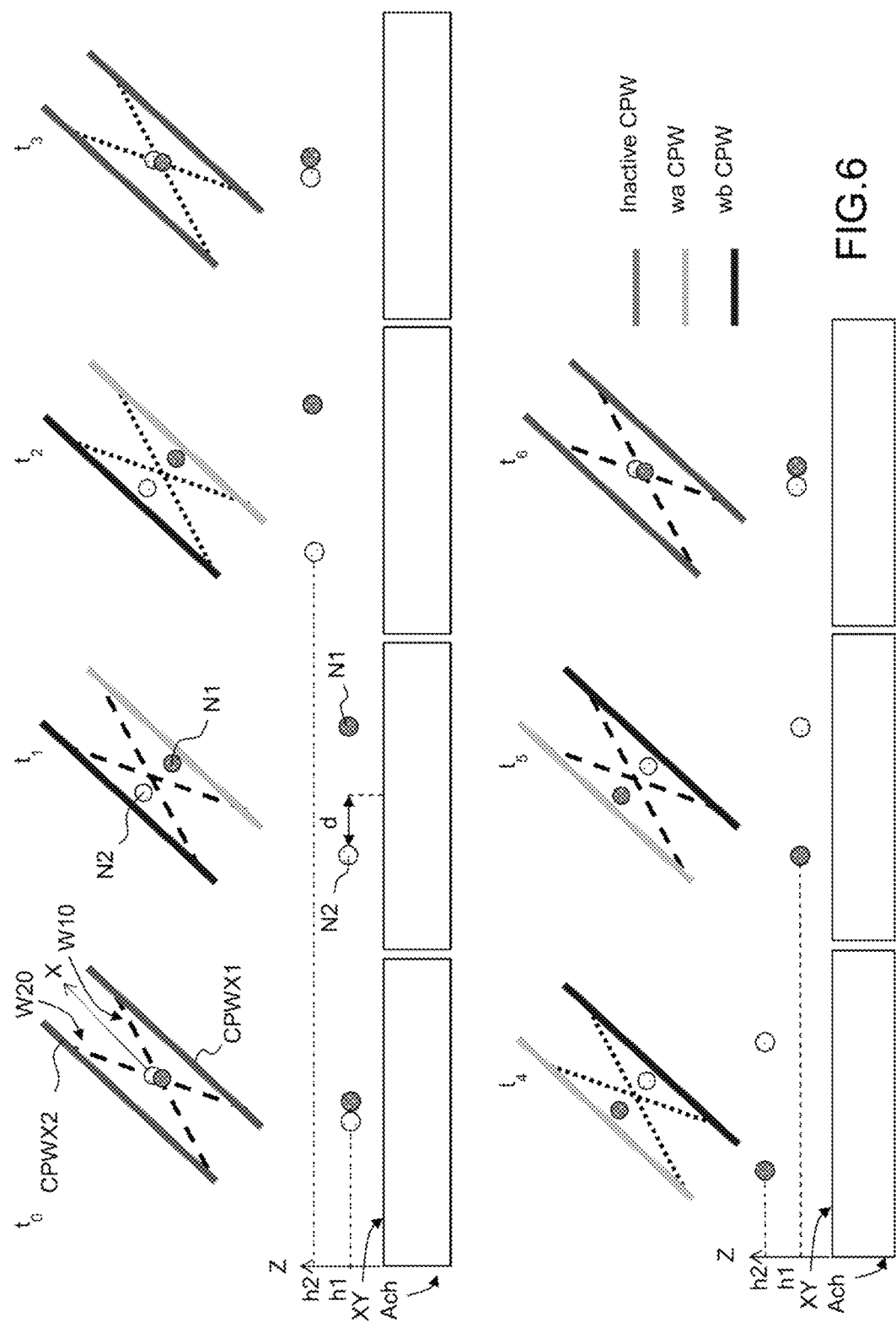
FIG. 6 describes the movement sequence of the clouds of atoms for obtaining the path TX.
Figure 7:
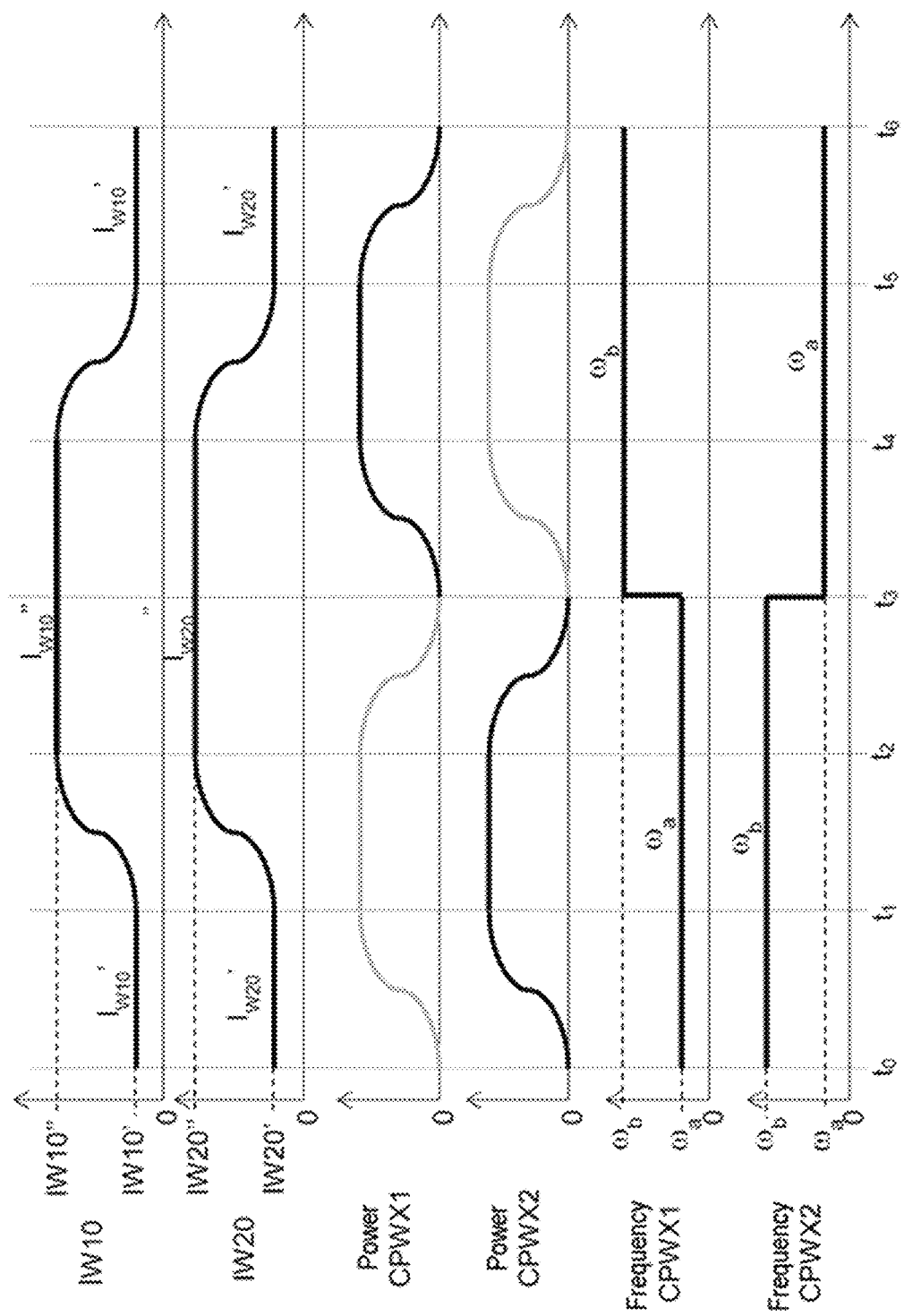
FIG. 7 illustrates the timing diagram that describes the currents applied to the conductive strips, the powers and frequencies applied to the waveguides as a function of time to obtain the movement sequence from FIG. 6.
Figure 14:
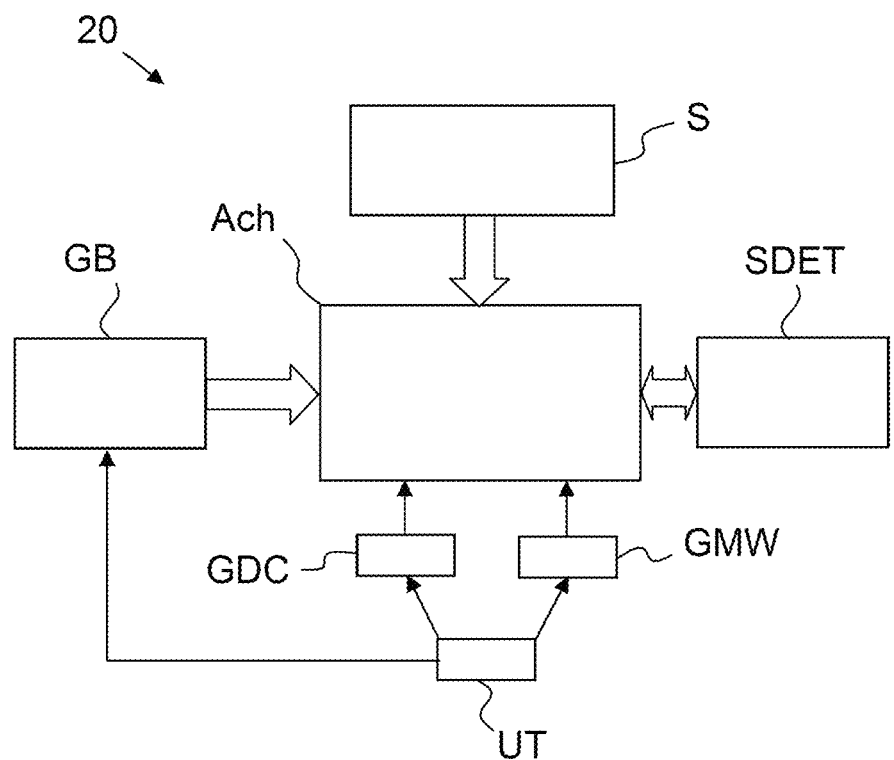
FIG. 14 illustrates an ultra-cold atom sensor according to the invention allowing a rotational velocity measurement along at least the axis Z.
Figure 15:
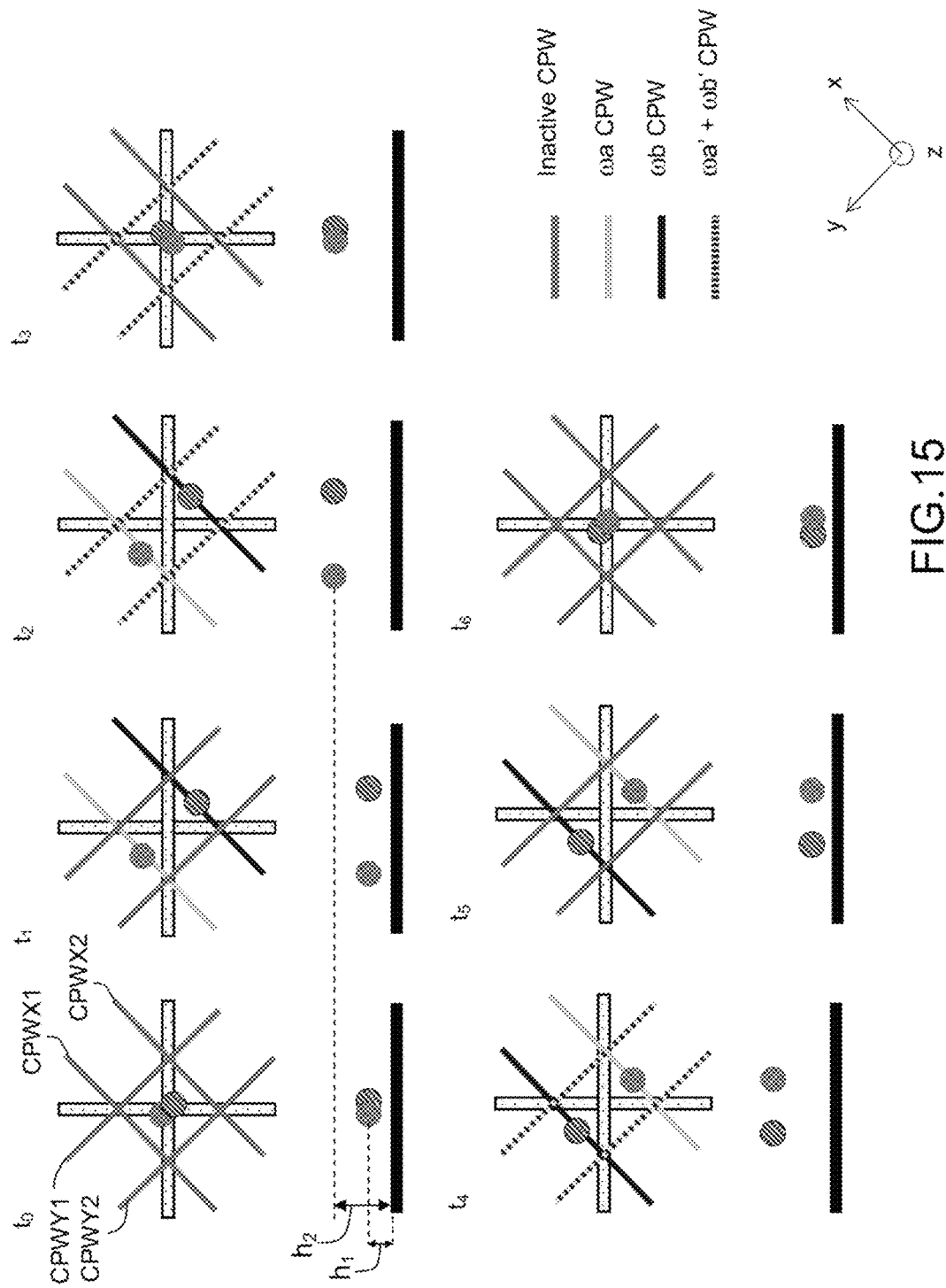
FIG. 15 illustrates one exemplary embodiment of a path TX with a chip according to the invention.

In document FR2004743, the geometry with two conductive wires, when the chip is integrated into an inertial sensor, makes it possible to produce two closed paths TX and TY intended to be travelled by the two clouds N1 and N2 of cold atoms 12, these paths being contained not in a plane parallel to the plane XY as in document WO2017089489, but in two planes that are perpendicular to XY or vertical: the plane YZ perpendicular to X for TX, as illustrated in FIG. 5, and the plane XZ perpendicular to Y' for TY. FIG. 6 describes the movement sequence of the clouds of atoms for obtaining the path TX. A light grey shade of the guide corresponds to the application of an angular frequency ωa to this guide, and a dark grey shade corresponds to the application of an angular frequency ωb, the intermediate grey shade corresponding to an inactive guide to which no signal is applied. Lines in long dashes signify that low levels of DC current are applied to the wires W10 and W20, respectively Iw10' and Iw20', while dot-and-dash lines signify that high levels of DC current are applied to W10 and W20, respectively Iw10" and Iw20". The two clouds are separated by applying ωa to CPWX1 and ωb to CPWX2, while the height is changed, from h1 to h2, by changing from the low current level to the high current level in the conductive wires. This is illustrated on the timing diagram of FIG. 7, which describes the currents IW10 and IW20 applied respectively to W10 and W20, the powers and the frequencies applied to CPWX1 and CPWX2, as a function of time. Thus, in document FR2004743, the switch from h1 to h2 in order to create the "vertical" paths TX and TY is implemented by applying two-level DC signals to the two wires. In that document, the measurement along Z with the "horizontal" path (in the plane XY) is performed with a plurality of conductive wires, by moving the clouds by moving the magnetic field minimum, obtained by successively activating various points of intersection between the wires, as illustrated in FIGS. 14 and 15 of that document.

With the chip Ach according to the invention with two conductive strips, the inventors have developed an addressing method allowing the clouds of atoms 12 to describe, in the opposite direction, a horizontal path (parallel to the plane XY), called first path TZ, without requiring additional wires/strips. With the chip according to the invention, a horizontal path is obtained with only two strips, and by applying specific microwave signals in a particular interferometry time sequence, the conductive strips themselves being kept at a constant current. The condition for creating the path TZ is:

i) on the one hand, that the intersection between the first and the second surface is greater than or equal to 40% of the first surface S1, ii) on the other hand, the implementation of a particular interferometry sequence, including applying, to one of the waveguides, a microwave signal comprising the superposition of a signal at a first angular frequency (ωa or ωa') and a signal at a second angular frequency (ωb or ωb'). This signal, proportional to Ea·cos(ωat)+Eb·cos(ωbt) (respectively to Ea'·cos(ωa't)+Eb'·cos( b't)) is called sum signal, and denoted signal [a+b] or signal [a'+b'] depending on the angular frequencies forming it.

Figure 8:
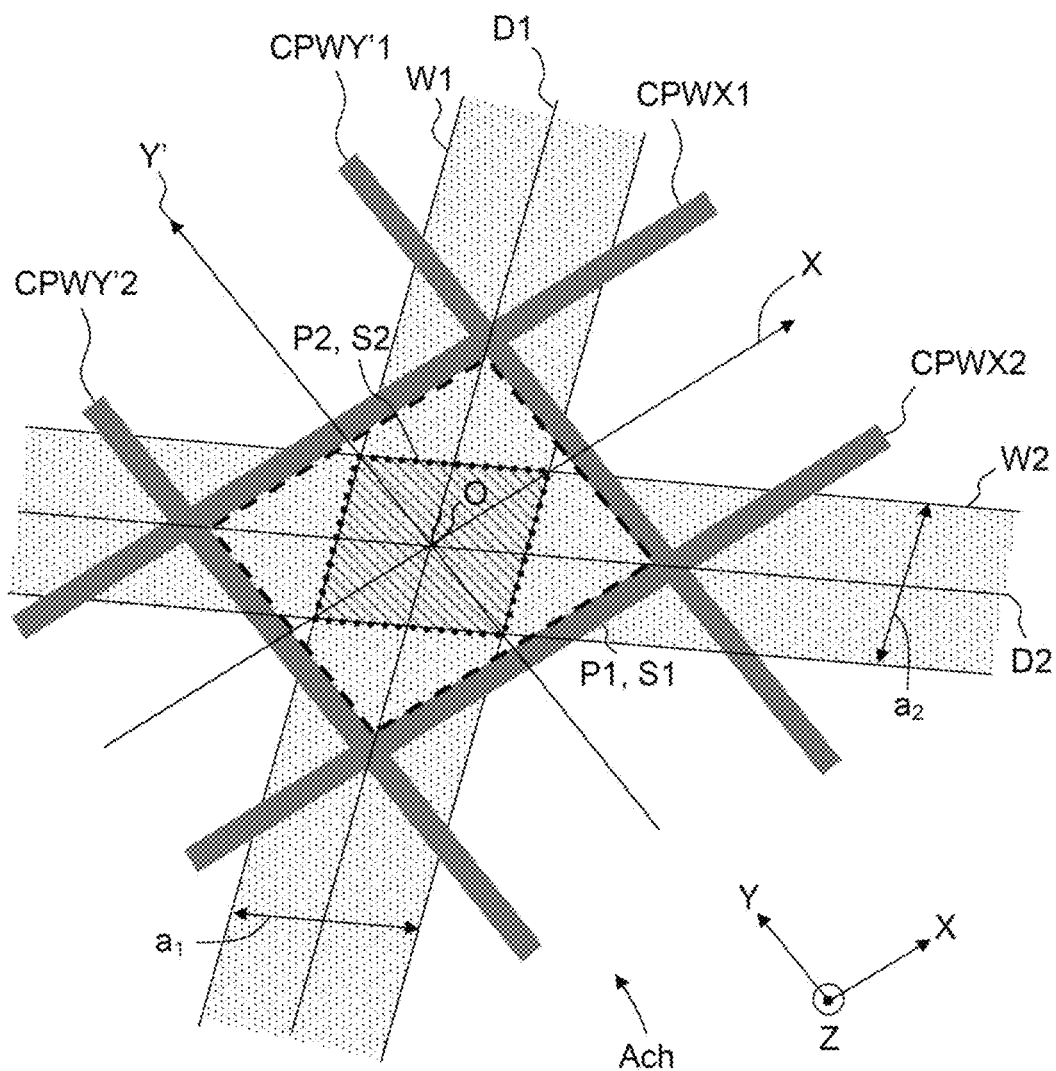
FIG. 8 describes one embodiment of the atom chip according to the invention in which the strips W1 and W2 are plumb with the points of intersection of the waveguides.

For issues of symmetries of the potential applied to obtain the atom traps, the strips W1 and W2 are preferably plumb to the points of intersection of the waveguides, this being reflected by the fact that the first strip W1 and the second strip W2 are respectively oriented along a first diagonal D1 and a second diagonal D2 of the first parallelogram P1, as illustrated in FIG. 8.

Preferably, W1 and W2 are perpendicular to one another.

Preferably, the second pair of waveguides is perpendicular to the first pair of waveguides, the axis Y' then being coincident with the axis Y.

Figure 9:
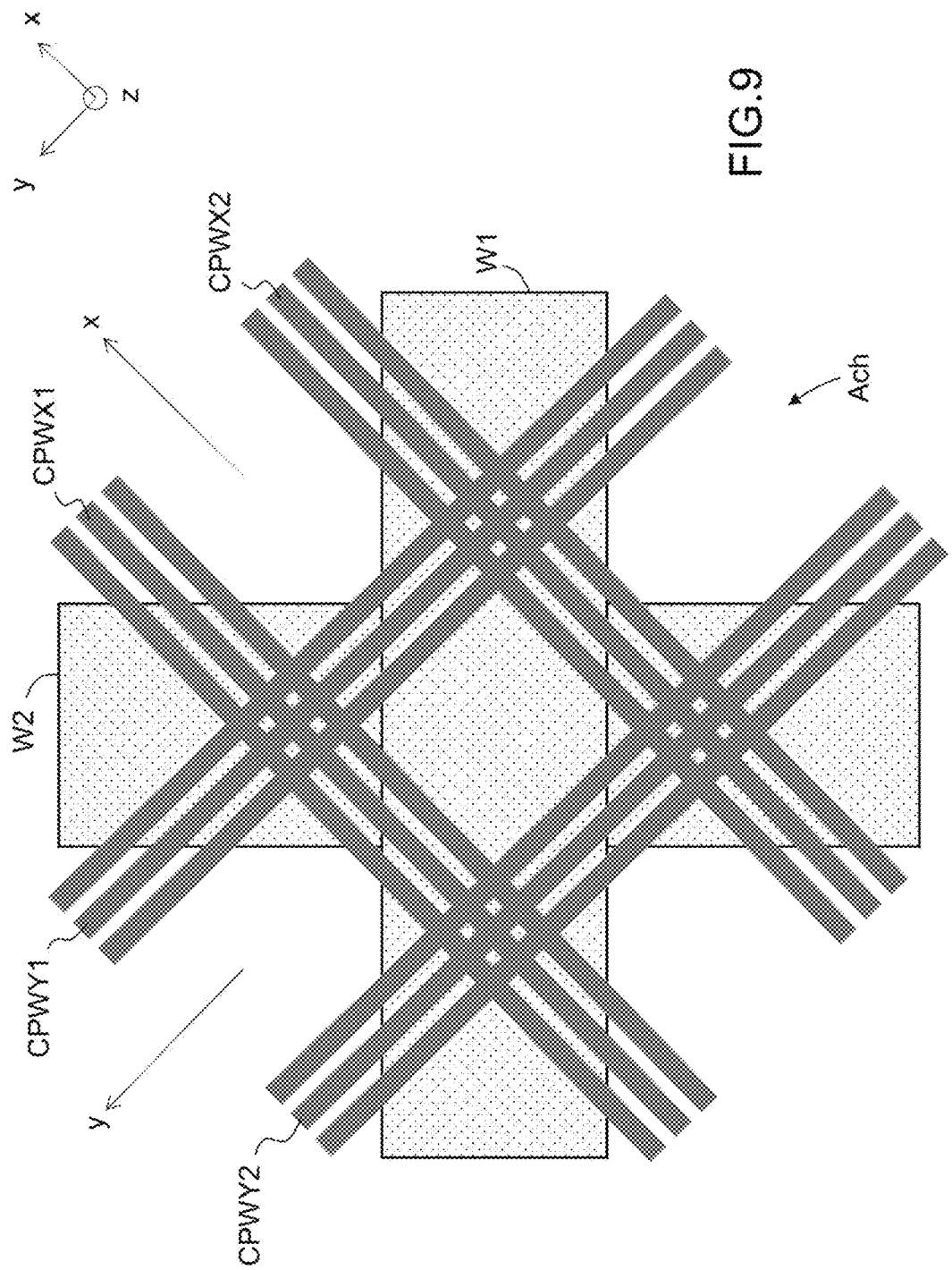
FIG. 9 describes one preferred embodiment in which the strips are perpendicular to one another, the pairs of waveguides are perpendicular to one another and are oriented at 45° from the strips.

According to one preferred embodiment, the strips are perpendicular to one another, the pairs of waveguides are perpendicular to one another and are oriented at 45° from the strips, as illustrated in FIG. 9 with waveguides with three conductive wires. Hereinafter, various non-limiting exemplary implementations of the atom chip Ach according to the invention in an ultra-cold atom sensor are given with this preferred embodiment, but it is understood that these examples are applicable to any type of atom chip according to the invention.

For greater clarity of certain drawings, the conductive strips according to the invention are illustrated as thin rather than wide as claimed. The convention of the grey shades and lines is: a light grey shade of the guide corresponds to the application of an angular frequency ωa or ωa' to this guide, a dark grey shade corresponds to the application of an angular frequency ωb or ωb', an intermediate grey shade corresponds to an inactive guide to which no signal is applied, and a dashed line corresponds to the application of a sum signal [a+b] or [a'+b'].

The inventors have established that, with a chip Ach according to the invention, once the clouds have been separated by applying different angular frequencies to each of the guides of a pair, it was possible, by applying a sum signal to one of the waveguides of the other pair, to repel the two clouds from the side opposite that of the "activated" guide with the sum signal. While the clouds describe the first path TZ, a current of constant strength is applied to the strips.

Figure 10:
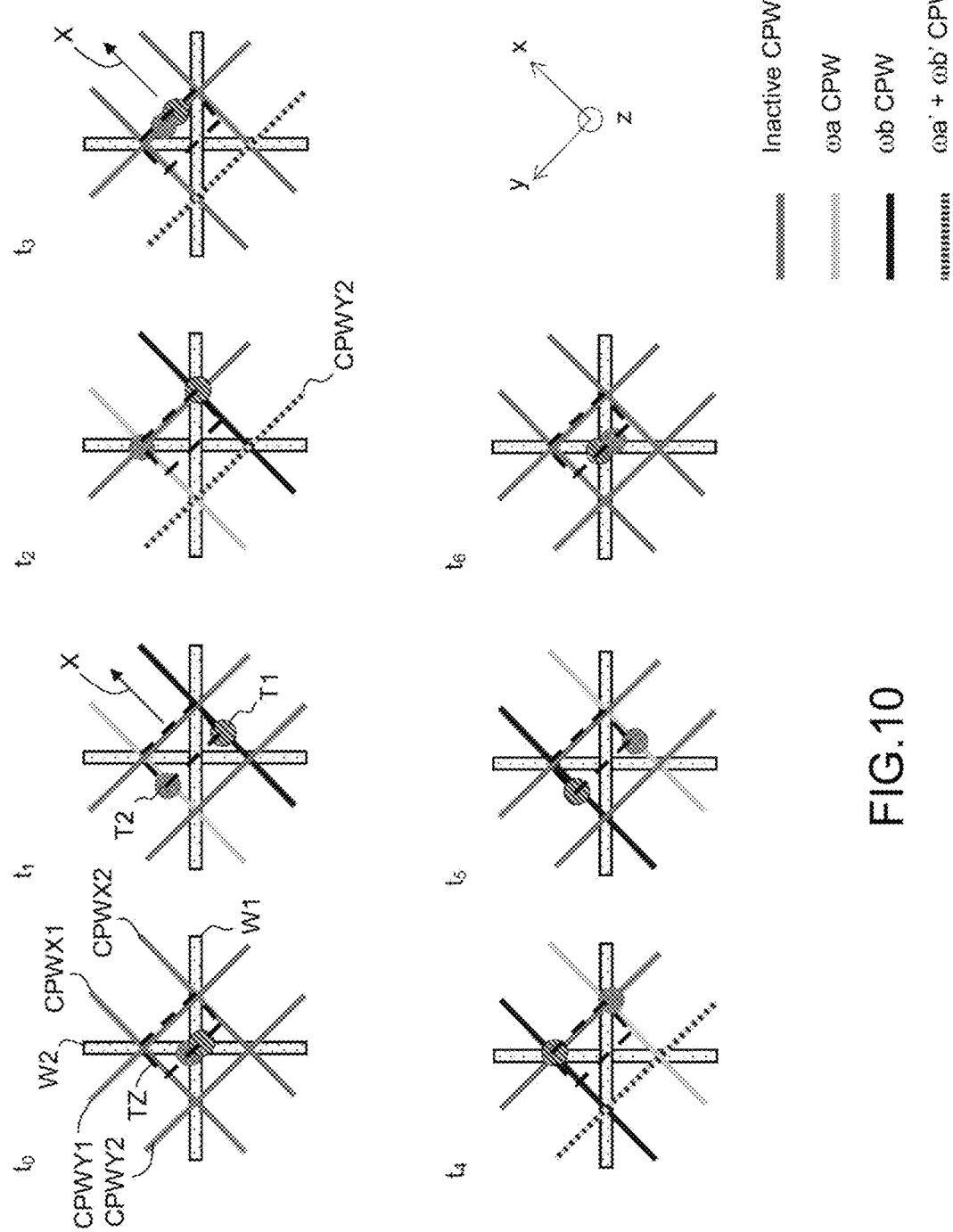
FIG. 10 illustrates a first example of a first path TZ through movement of the two trapped clouds.

A first example of a first path TZ through movement of the two trapped clouds is illustrated in FIG. 10, the movement being illustrated at various times t1 to t6 of the addressing time sequence. The signals applied to the guides and strips as a function of time are illustrated in FIG. 11. The units on the axes are arbitrary. $P_{CPWX1}$ is the power of the microwave signal applied to CPWX1 and Iw1 is the current applied to the strip W1.

Figure 1:
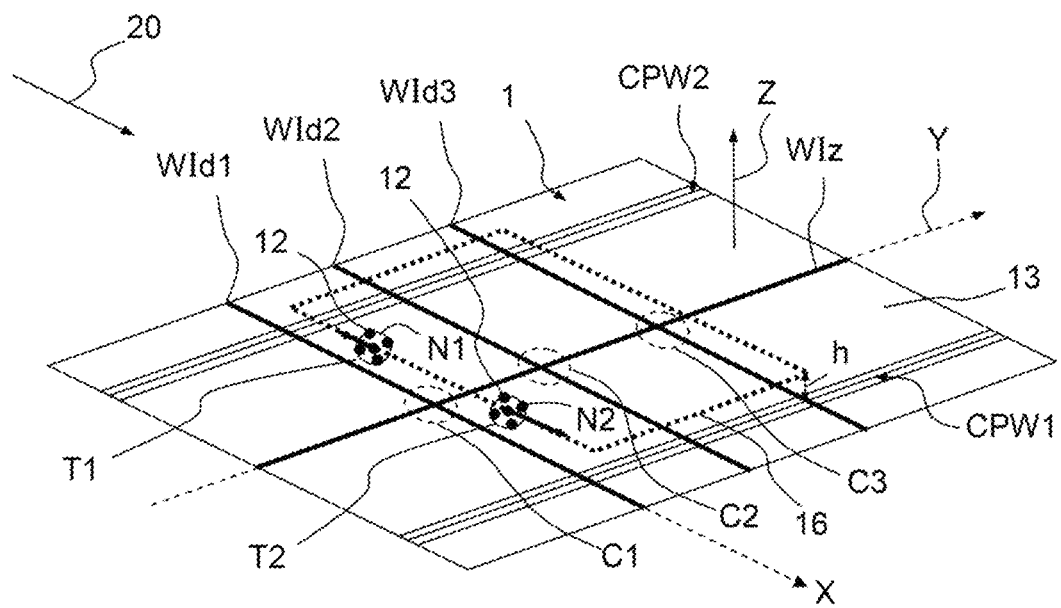
FIG. 1, already cited, illustrates one example of a topology of the conductive wires and the microwave guides and of a path of the two clouds of atoms.
Figure 2:
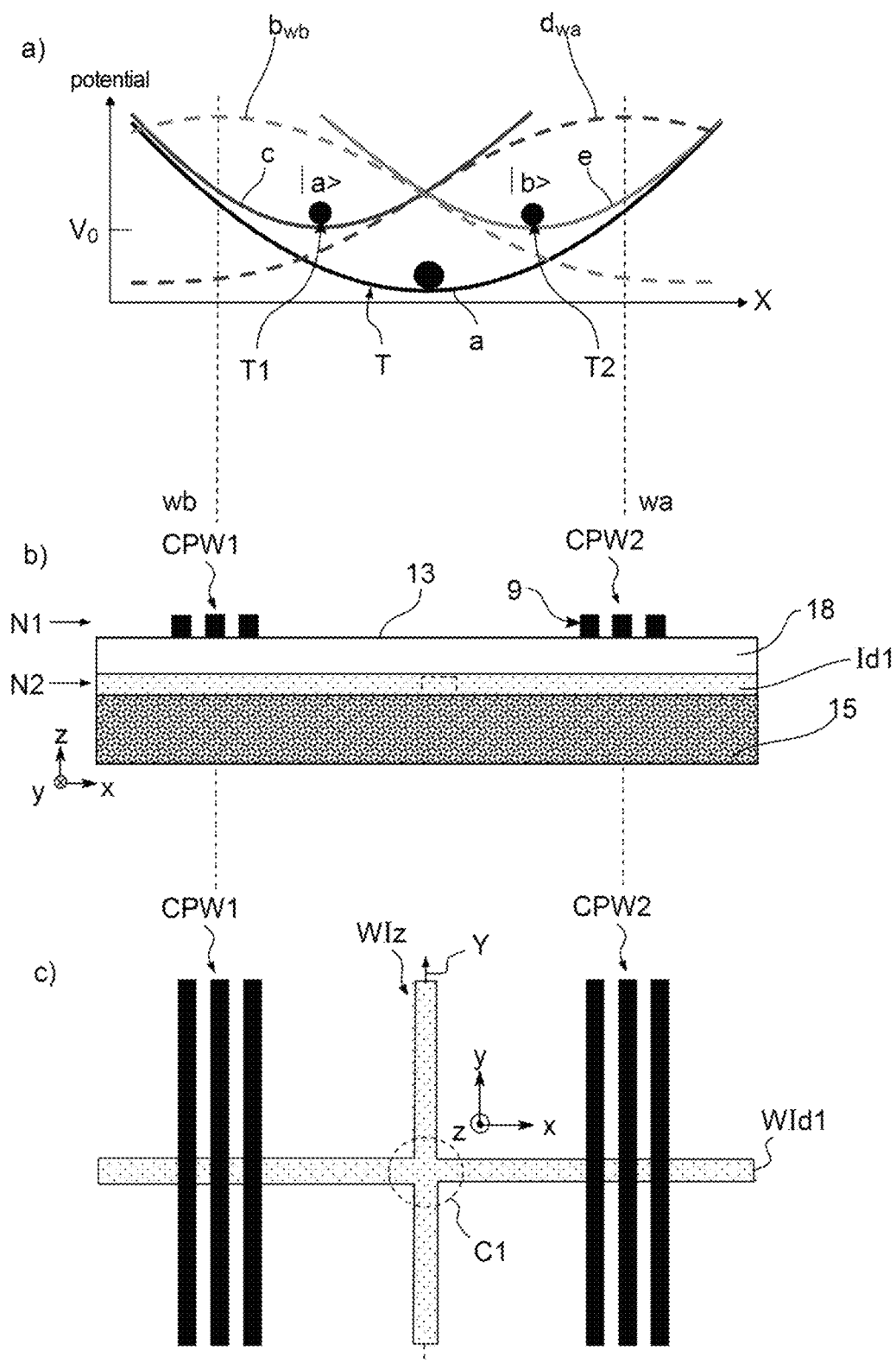
FIG. 2, already cited, illustrates the geometry of the guides and wires of the atom chip as well as the traps T1 and T2.
Figure 3:
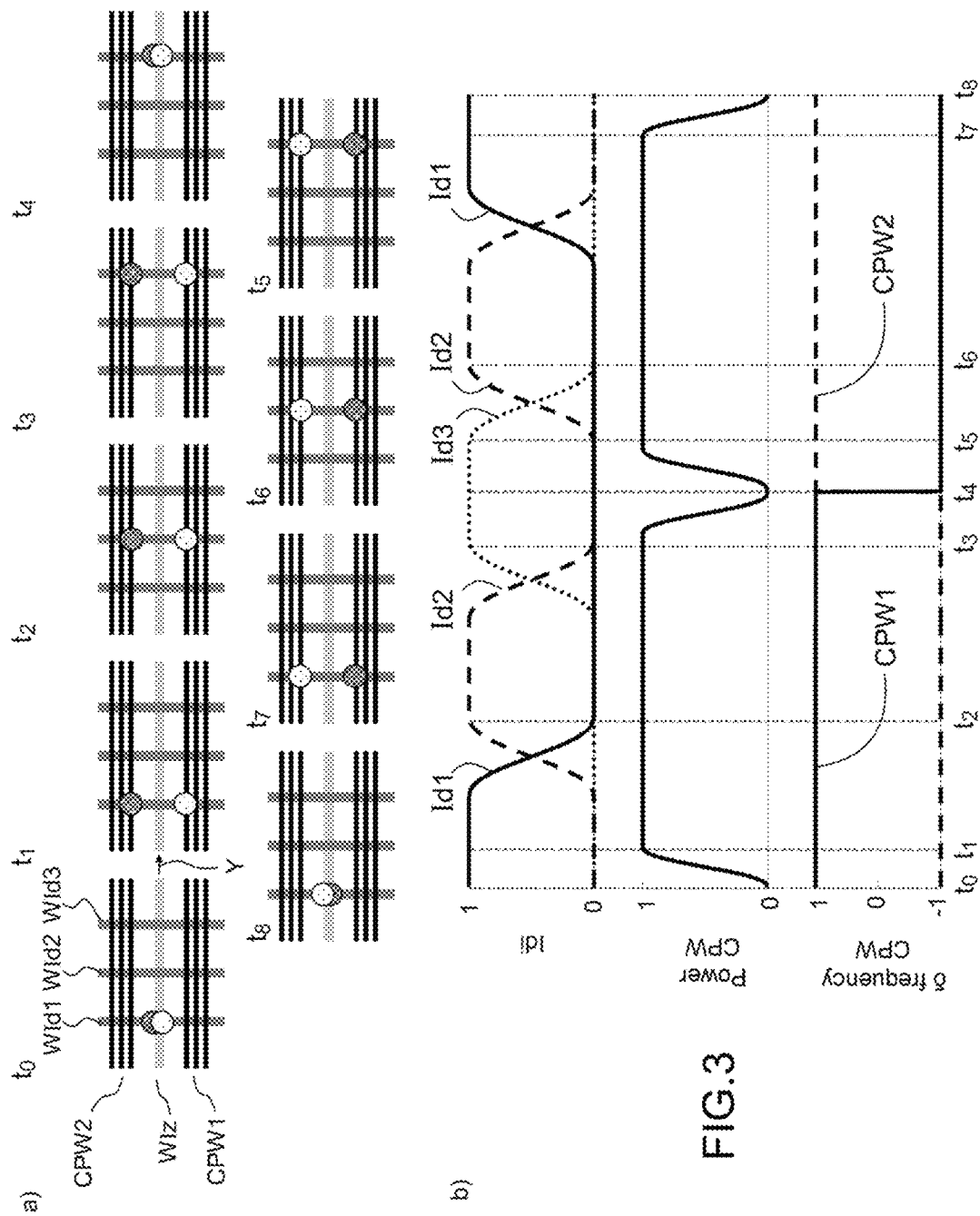
FIG. 3, already cited, illustrates the principle of generating the path of the clouds of atoms on the atom chip.

Just before t0, the internal states are initialized by coherently superposing the ultra-cold atoms between the states |a> and |b> through a first pulse π/2. The currents Iw1 and Iw2 are imposed respectively on the conductive wires W1 and W2. The two internal states |a> and |b> are coherently and spatially superimposed plumb to the point O in a trap T (equivalent to step B0 and the time t0 in FIG. 3, or to t0 in FIG. 6).

The phase of free evolution then begins.

Between t0 and t1, the microwave power injected into the waveguides CPWX1 and CPWX2 changes gradually from 0 to its maximum value. An angular frequency $\omega_a$ is sent into the waveguide CPWX1 and an angular frequency $\omega_b$ is sent into the waveguide CPWX2, thereby making it possible to separate the two clouds with different internal states onto either side of the axis of symmetry X, by a distance d, to the positions depicted schematically in t1. The ultra-cold atom trap T described above at the time t0 is then transformed into two ultra-cold atom traps T1 and T2, each trap making it possible to immobilize a cloud of ultra-cold atoms with internal states different from the other trap (in this case with internal states |a> in one of the traps, for example T1, and with internal states b> in the other trap T2). It will be recalled that a frequency ωa (or ωa') applied to a waveguide "pushes" the trapped atoms in the state |a> (T1) from the side opposite this waveguide, and that a frequency ωb (or ωb) applied to a waveguide "pushes" the trapped atoms in the state |b> (T2) from the side opposite this waveguide. Each cloud is illustrated by a different texture, T1 in stripes and T2 in dots. This is the equivalent of the time t1 in FIG. 3 and in FIG. 6.

Between t1 and t2, the microwave power of the guide CPWY2 changes gradually from 0 to its maximum value by applying a sum microwave signal formed by the superposition of a microwave signal at an angular frequency ωa' and a microwave signal with an angular frequency ωb. The angular frequencies ωa' and ωb' are a priori different from ωa and ωb, but according to one particular case may be equal (ωa'=ωa, ωb'=ωb). Generally speaking, the pairs (ωa, ωb) and (ωa', ωb') are chosen based on the material used for the atoms. For the case of rubidium 87, they are linked to Zeeman transitions (see abovementioned publication by Ammar et al). The reward serves only to distinguish between what is applied to the guides along X and the guides along Y, but the two pairs are interchangeable.

The effect of this "sum" microwave power is that of repelling the two clouds from the side opposite the one where the guide CPWY2 is located, the two clouds still being kept separate by a distance d along X by applying the signals to CPWX1 and CPWX2. The component at ωa in the guide CPWY2 makes it possible to push the state |a> from the side opposite CPWY2, that is to say towards CPWY1 and the component at ωb in the guide CPWY2 makes it possible to push the state |b> from the side opposite CPWY2, that is to say towards CPWY1. Applying a signal that superposes the two frequencies, for example to CPWY2, repels the two clouds in the same direction with the same guide. "Pushing force" is the name given to the force that makes it possible to push the clouds of atoms by activating microwave guides.

The wires W1 and W2 create a trap called DC magnetic trap, and this trap exerts a return force on the atoms. This return force opposes the pushing force. With a fixed current in W1 and W2, for traps situated at distances (along the Z) close to the wire, typically at less than 5 times the width of the wire, this return force decreases when the width of the wire is increased. Therefore, in order to best take advantage of this force that pushes the clouds, it is necessary to reduce the return force of the DC magnetic trap, and therefore to increase the width of the wires.

This is all the more true as, in the invention, only microwave fields are used to "push" the atoms. The inventors have shown that the return force is sufficiently reduced to generate closed paths for the clouds when the surface of intersection of the strips S2 covers a sufficient part of the inter-guide space S1, reflected by condition (1).

From t2 to t3, the signals applied to CPWX1 and CPWX2 are gradually reduced, and the clouds move closer to X.

From t3 to t4, the powers applied to CPWX1 and CPWX2 are gradually increased again while inverting the frequencies ωa and ωb, and the two clouds, once they have crossed, move away from X on the other side from their side of arrival. From t4 to t5, the sum signal applied to CPWY2 is gradually cut off, and the two clouds move closer to this guide while remaining separated along X.

From t5 to t6, the signals applied to CPWX1 and CPWX2 are gradually cut off, and the clouds move closer to the point O and at t6 they are located plumb thereto (end of the phase of free evolution).

During the time sequence from t0 to t6, the two clouds of atoms have described the path TZ in opposing directions, thereby making it possible to measure a rotational velocity Ωz as explained above.

Throughout the entire time sequence of the movement of the clouds along the first path TZ (and their recombination), the current applied to the two strips has remained constant ($I_{W1}$ at W1 and $I_{W2}$ at W2), and the movement is driven only by the application of the microwave signals to the various waveguides of the chip Ach. Since the currents in W1 and W2 and the homogeneous field 20 do not change during the sequence, the DC magnetic trap does not move (unlike in document WO2017089489, where one wire is gradually deactivated so as to activate another one, this having the effect of moving the DC magnetic trap). In the invention, it is only the changes in the microwave fields (power, frequency and guide in which they propagate) that make it possible to move the two dressed traps and therefore to move the atoms.

In the separation/movement interferometry time sequence:

the guides along X of the first pair are passed through simultaneously by microwave signals with single angular frequencies ωa or ωb, at certain times called first set of times E1 {t1, t2, t4, t5}, at least one of the guides along Y' of the second pair (CPWY2 in the example) is passed through by a microwave signal "frequency sum" formed by the superposition of a microwave signal at an angular frequency ωa' and a microwave signal with an angular frequency ωb', at certain times called second set of times E2 {t2, t3, t4}.

E2 has the times t2 and t4 in common with E1.

To create the above path TZ according to the first example, the clouds were separated along X and these clouds were repelled along Y. It is also possible to generate the path TZ from the other side, by activating the guide CPWY1 with the sum signal rather than CPWY2.

To increase the surface contained within the closed path and therefore the sensitivity of the rotational velocity measurement, according to one option, the other guide along Y is activated with a sum signal, the guide CPWY1 in the example from FIG. 10, after the activation of the first guide along Y CPWY 2. The movement sequence and the path obtained are illustrated in FIG. 11bis.

Figure 12:
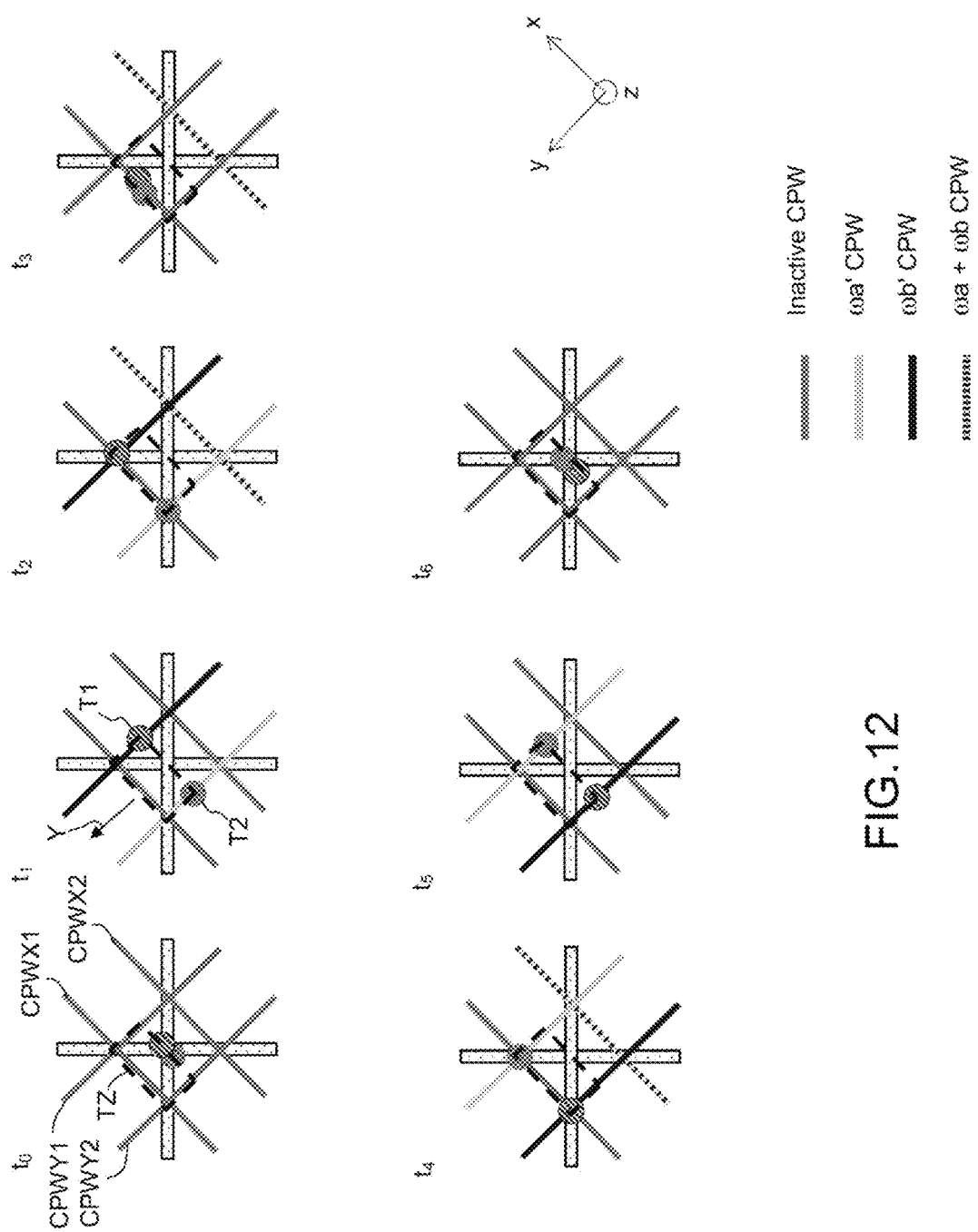
FIG. 12 illustrates a second example of a first path TZ through movement of the two trapped clouds.
Figure 13:
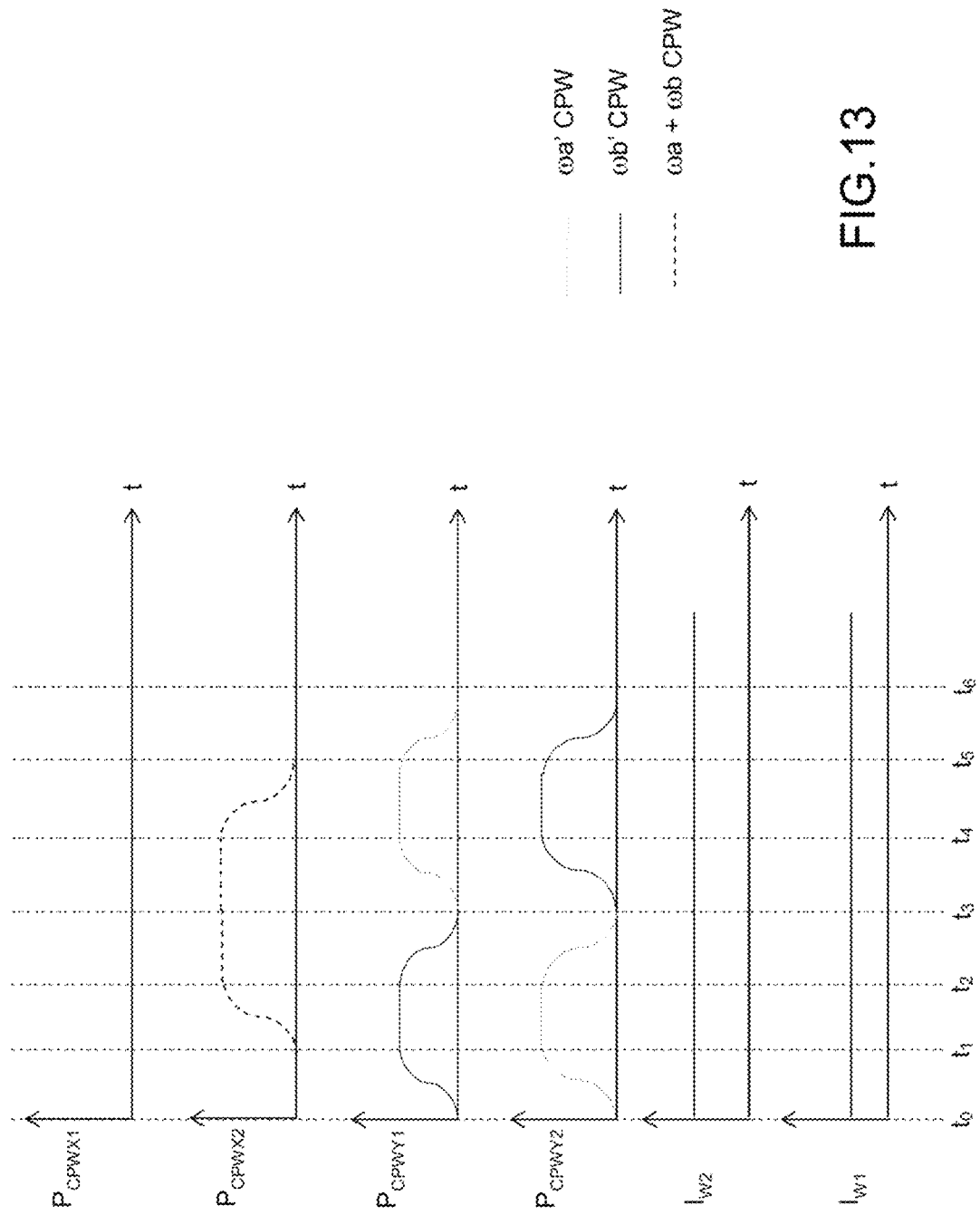
FIG. 13 illustrates the timing diagram associated with the movements of the clouds from FIG. 12.

In a symmetrical manner, according to a second example, it is possible to generate a horizontal path TZ by separating along Y and repelling along X, as illustrated in FIGS. 12 and 13.

According to a second aspect, the invention relates to an ultra-cold atom sensor 20 allowing a rotational velocity measurement along at least the axis Z as illustrated in FIG. 14.

The sensor 20 comprises an atom chip Ach as described above placed in a vacuum chamber (not shown) and an atom source S designed to generate a cloud of ultra-cold atoms 12 close to the plane XY of the atom chip Ach. The ultra-cold atoms have, in the phase of initializing the implementation of the sensor, a superposition of internal states |a> and |b>.

The sensor 20 also comprises a generator GB for generating a homogeneous magnetic field B0, preferably parallel to the plane of the chip, at least one processor UT, at least one DC current or voltage generator GDC designed to control electric currents in said conductive strips and at least one microwave current or voltage generator GMW connected to said waveguides. There may typically be one generator GMW for the 4 guides, or 2 generators (1 for each guide pair) or 4 generators (1 per guide). The waveguides along X and Y' and the conductive strips W1 and W2 are configured so as to perform the following steps when the sensor is implemented:

First of all, the energy of the ultra-cold atoms is modified so as to create a potential minimum for the ultra-cold atoms in the internal state |a> and a potential minimum for the ultra-cold atoms in the internal state |b>, thus forming a first ultra-cold atom trap T1 and a second ultra-cold atom trap T2, a trap making it possible to immobilize a cloud of ultra-cold atoms 12 in an internal state different from the other trap, at a controlled distance h from the measurement plane (same as steps A0 and B0).

Next, the two traps T1 and T2 are spatially separated and moved along a first closed path TZ contained within a plane perpendicular to Z travelled in one direction by the ultra-cold atoms of the first trap and in the opposite direction by the ultra-cold atoms of the second trap.

The sensor also comprises an optical intensity detection system SDET designed to measure at least one population of ultra-cold atoms in one of the internal states.

The chip Ach according to the invention also makes it possible to measure a rotational velocity $\Omega x$ along X with traps covering a second closed path TX situated in a plane perpendicular to X and to measure a rotational velocity $\Omega y$ along Y' with traps covering a third closed path TY situated in a plane perpendicular to Y.

For this purpose, according to a first embodiment, the interferometry sequence described in document FR2004743 is used, the switch from h1 to h2 in order to create the "vertical" paths TX and TY being achieved by applying two-level DC signals to the two strips (see timing diagram of FIG. 6). The width of the strips does not disrupt the measurement carried out by the sensor.

The inventors have developed a second embodiment using a novel interferometry sequence using sum signals. Specifically, the inventors have shown that applying these sum signals made it possible to "repel" the clouds of atoms upwards, i.e. towards positive Zs. The inventors have shown that the pushing force is not perfectly horizontal but contains a small vertical component, and when $\omega a$ (or $\omega a'$) is applied to CPWX1 and CPWX2 at the same time, the horizontal component is cancelled out and the effect of the vertical component is exacerbated. This has the effect of moving the state |a> away from the surface of the chip. Likewise, if $\omega b$ (or $\omega b$) is applied, the state |b> is moved away from the chip. And therefore, when a sum signal that superposes $\omega a$ and $\omega b$ ($\omega a'$ and $\omega b$) is applied, the two states |a> and |b> are moved away from the chip. This effect therefore makes it possible to generate vertical paths.

Figure 16:
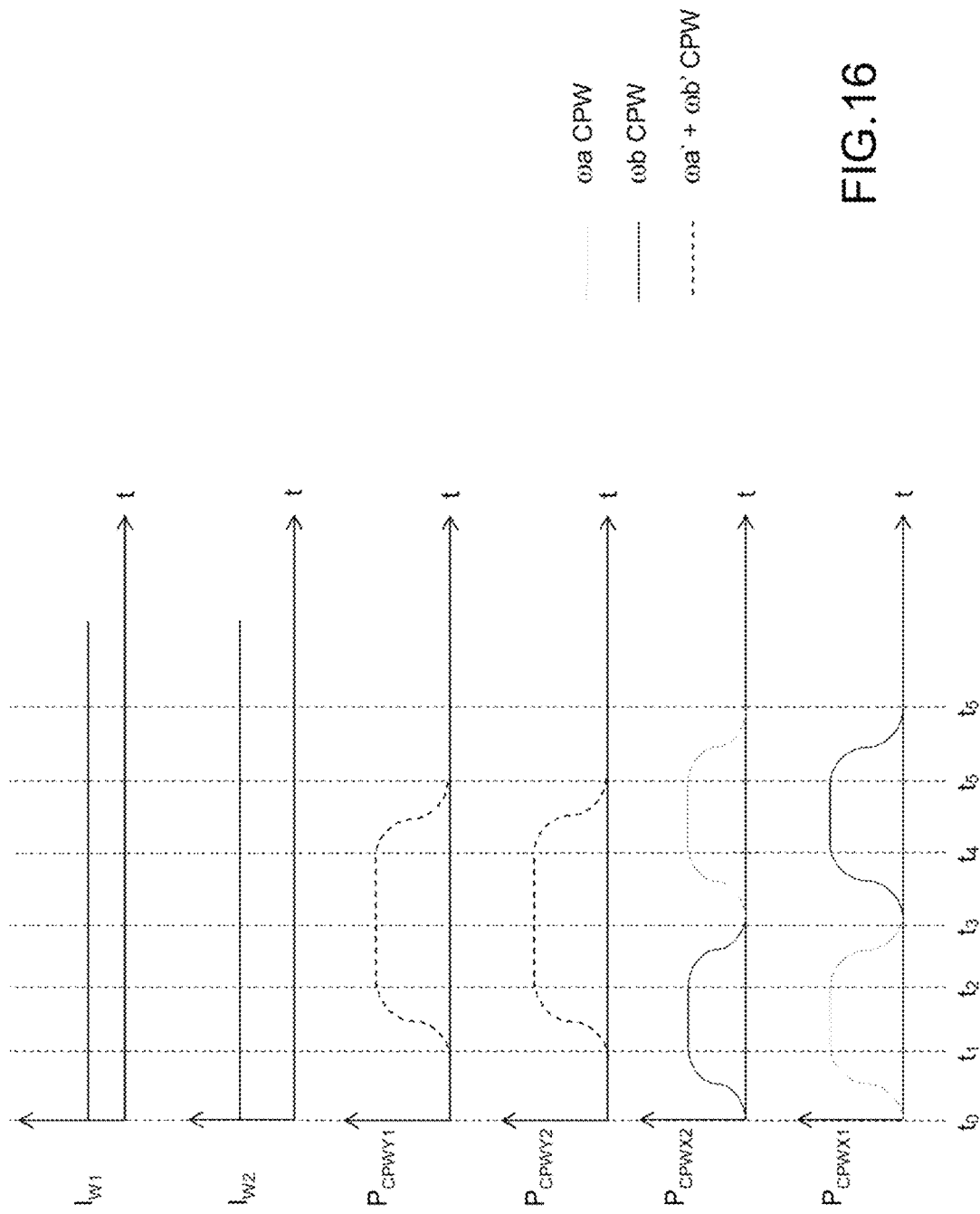
FIG. 16 illustrates the timing diagram associated with the movements of the clouds from FIG. 15.

One exemplary embodiment of a path TX is illustrated in FIG. 15, and the corresponding timing diagram of the microwave powers applied to the guides and the currents applied to the strips is illustrated in FIG. 16.

Between t0 and t1, the sequence is identical to FIG. 10. Once the clouds have been separated along X, between t1 and t2, a sum signal [a'+b'] is gradually applied simultaneously to the two guides along Y' until reaching a maximum value at t2. This simultaneous application of the sum signal to the two guides along Y' leads to the clouds moving away from the initial plane, making it possible to switch from a first height h1 to a second height h2 for the clouds of atoms 12, without modifying their position in terms of x and y.

From t2 to t3, the clouds move closer to X through a decrease in the microwave signal applied to the two guides along X, and then from t3 to t4, by inverting the frequencies that are applied, the clouds intersect and "move to the other side" of X.

From t4 to t5, the gradual reduction of the sum signal applied to the two guides along Y' causes the two clouds to descend back to h1, and then from t5 to t6 the gradual reduction of the single-frequency signals applied to the guides along X, leads to the clouds moving closer to the point O and at t6 they are located plumb thereto.

Throughout the entire sequence, the wires W1 and W2 have been subject respectively to a current Iw1 and Iw2 of constant value, the two values not necessarily being identical.

This thus created a path TX perpendicular to the axis X as illustrated in FIG. 5 by:
simultaneously applying to the guides along X of the first pair microwave signals with angular frequencies $\omega a$ or $\omega b$, at certain times called third set of times E3 {t1, t2, t4, t5}, simultaneously applying to the guides along Y' of the second pair a microwave signal formed by the superposition of a microwave signal at an angular frequency $\omega a'$ and a microwave signal with an angular frequency $\omega b'$, in order to switch from the first height h1 to the second height h2, at certain times called fourth set of times E4 {t2, t3, t4} having times in common with the third set of times,
applying to the first and second strips a constant current (not necessarily identical) during the separation, the movement and the recombination of the traps.

Figure 17:
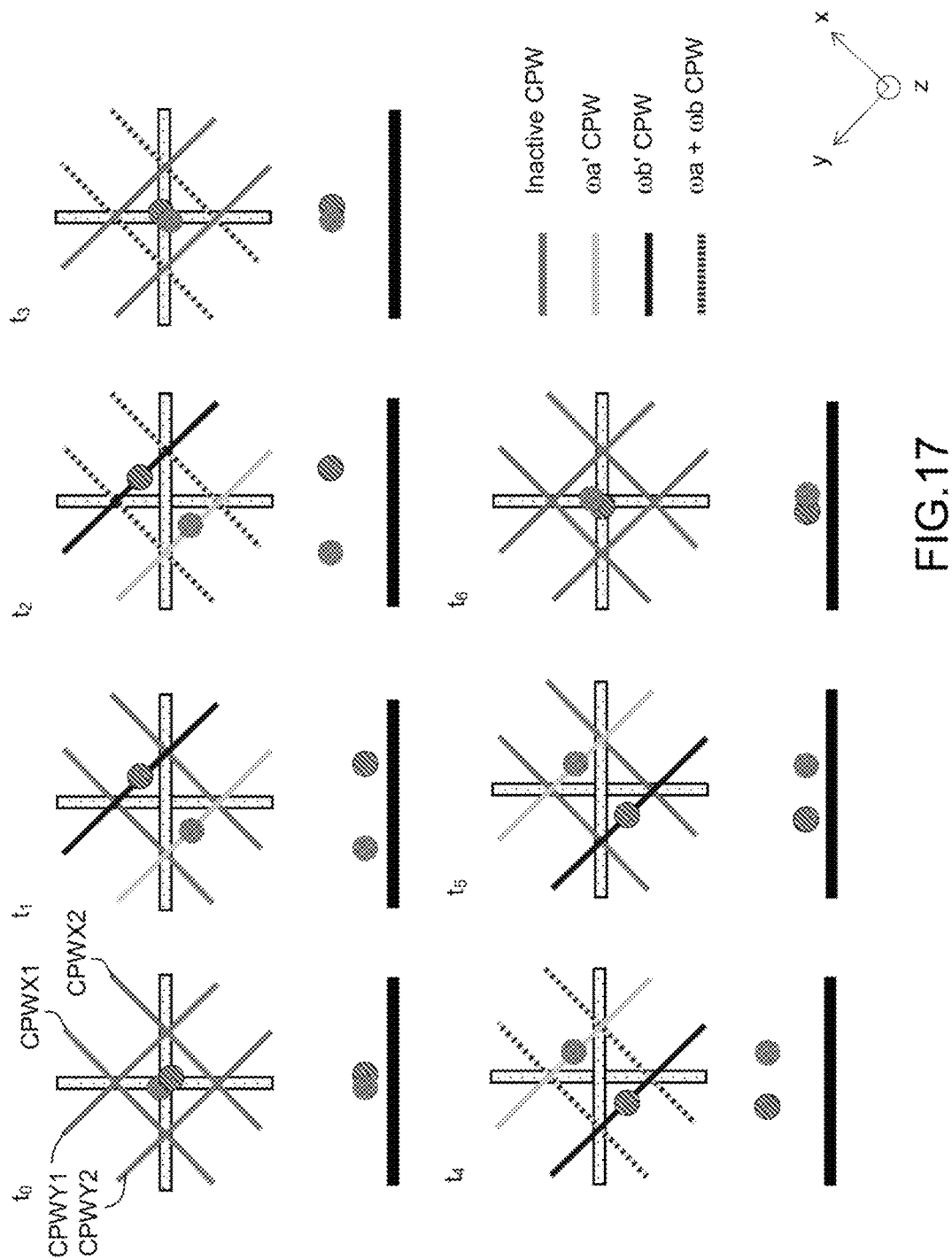
FIG. 17 illustrates one exemplary embodiment of a path TY with a chip according to the invention.
Figure 18:
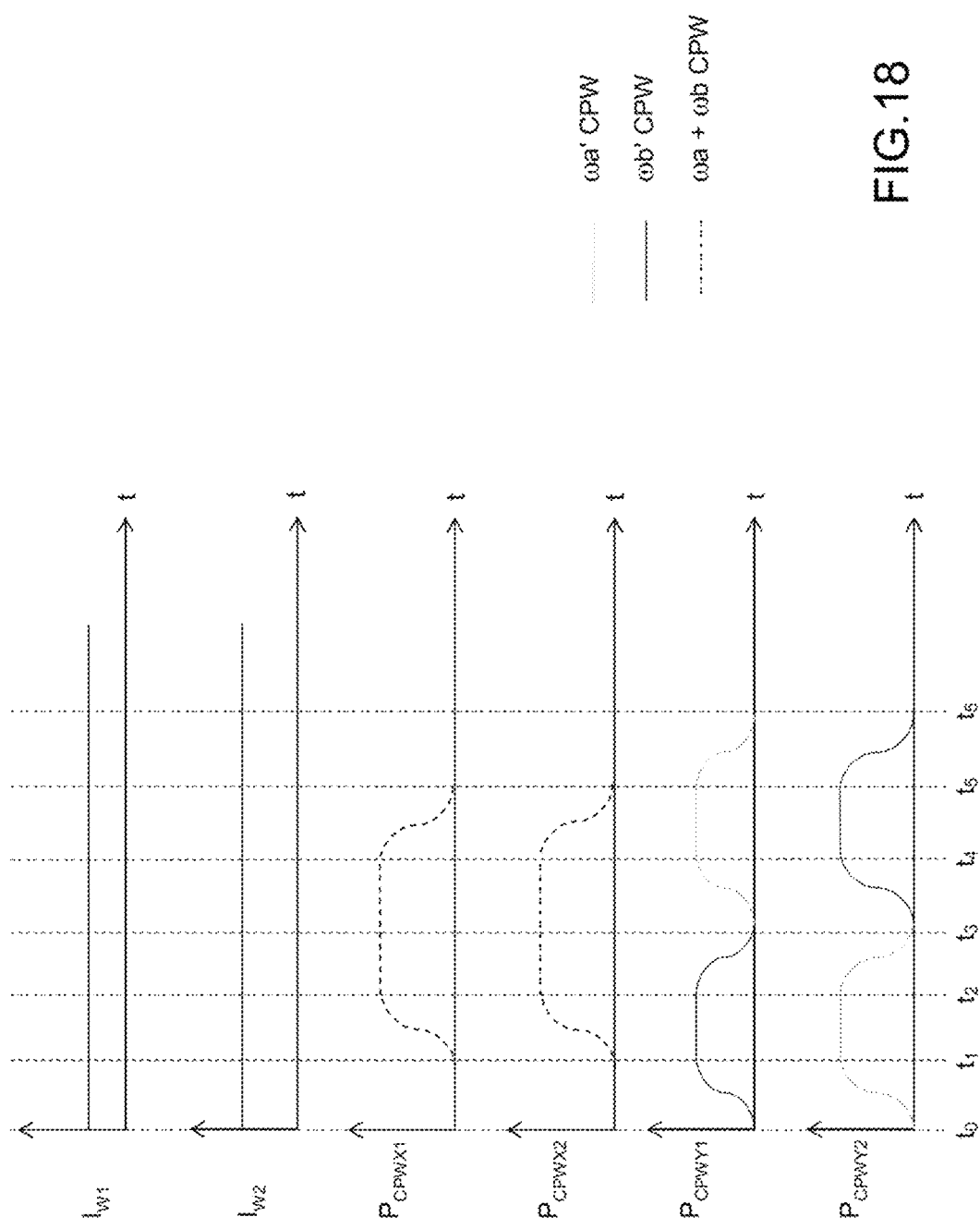
FIG. 18 illustrates the timing diagram associated with the movements of the clouds from FIG. 17.

Likewise, FIGS. 17 and 18 illustrate respectively the travel of a path perpendicular to Y' and the associated timing diagram.

Thus, a path TY perpendicular to the axis Y' is created by: applying simultaneously to the guides along Y' of the second pair microwave signals with angular frequencies $\omega a'$ or $\omega b'$, at certain times called third set of times E3 {t1, t2, t4, t5}, applying simultaneously to the guides along X of the first pair a microwave signal formed by the superposition of a microwave signal at an angular frequency $\omega a$ and a microwave signal with an angular frequency $\omega b$, in order to switch from the first height h1 to the second height h2, at certain times called fourth set of times E4 {t2, t3, t4} having times in common with the third set of times, applying to the first and second strips a constant current (not necessarily identical) during the separation, the movement and the recombination of the traps.

The very important advantage of the sensor 20 integrating a chip Ach according to the invention is that of forming a 3-axis gyroscopic sensor with a simple geometry with 4 waveguides and two conductive strips. The originality of the sensor according to the invention is firstly the geometry of the chip and secondly applying, when it is implemented, to certain waveguides and at certain times, a sum signal as defined above while applying a signal of constant amplitude to the conductive strips.

Figure 19:
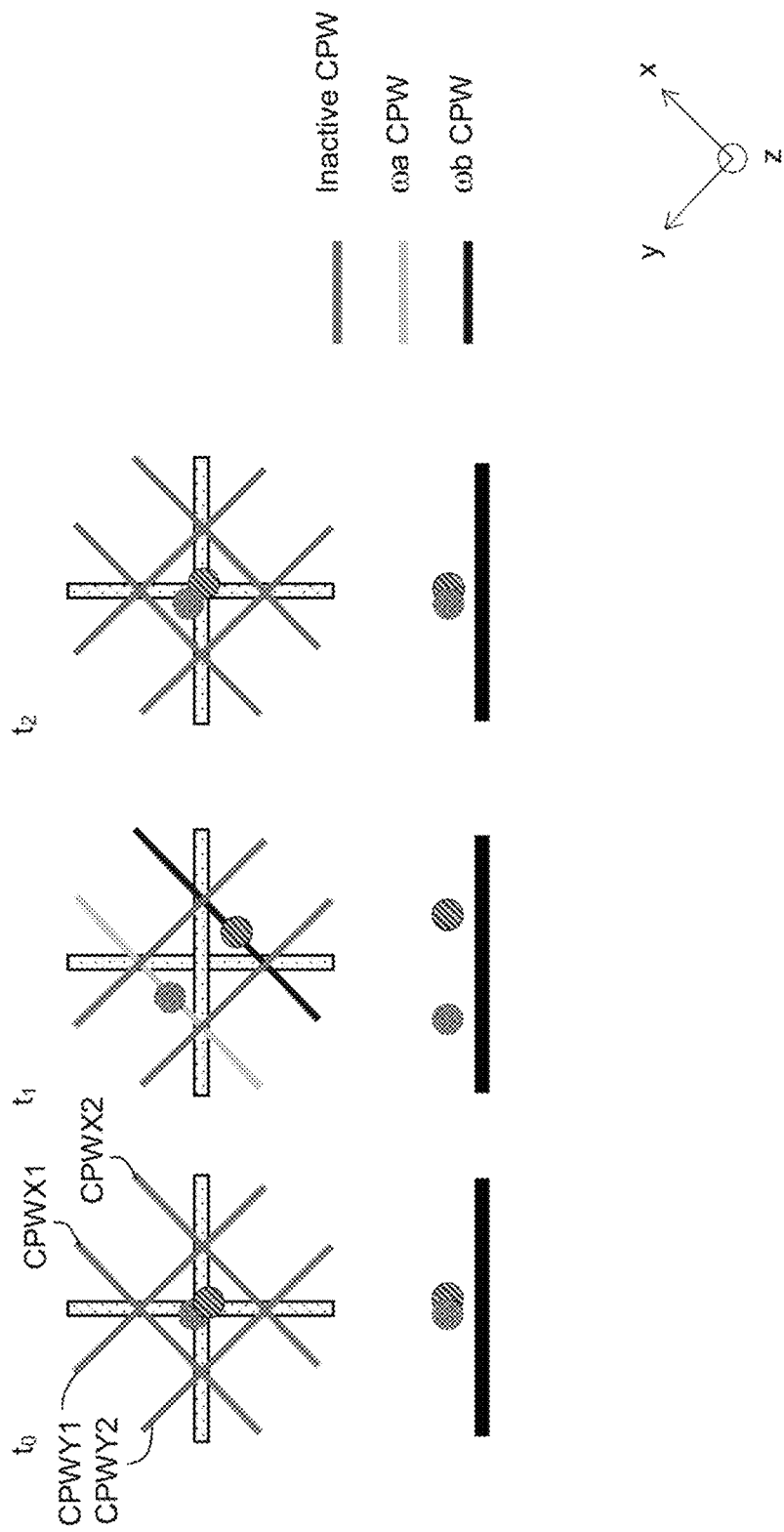
FIG. 19 illustrates one example of the movements of the clouds for the measurement of the acceleration along X ax.
Figure 20:
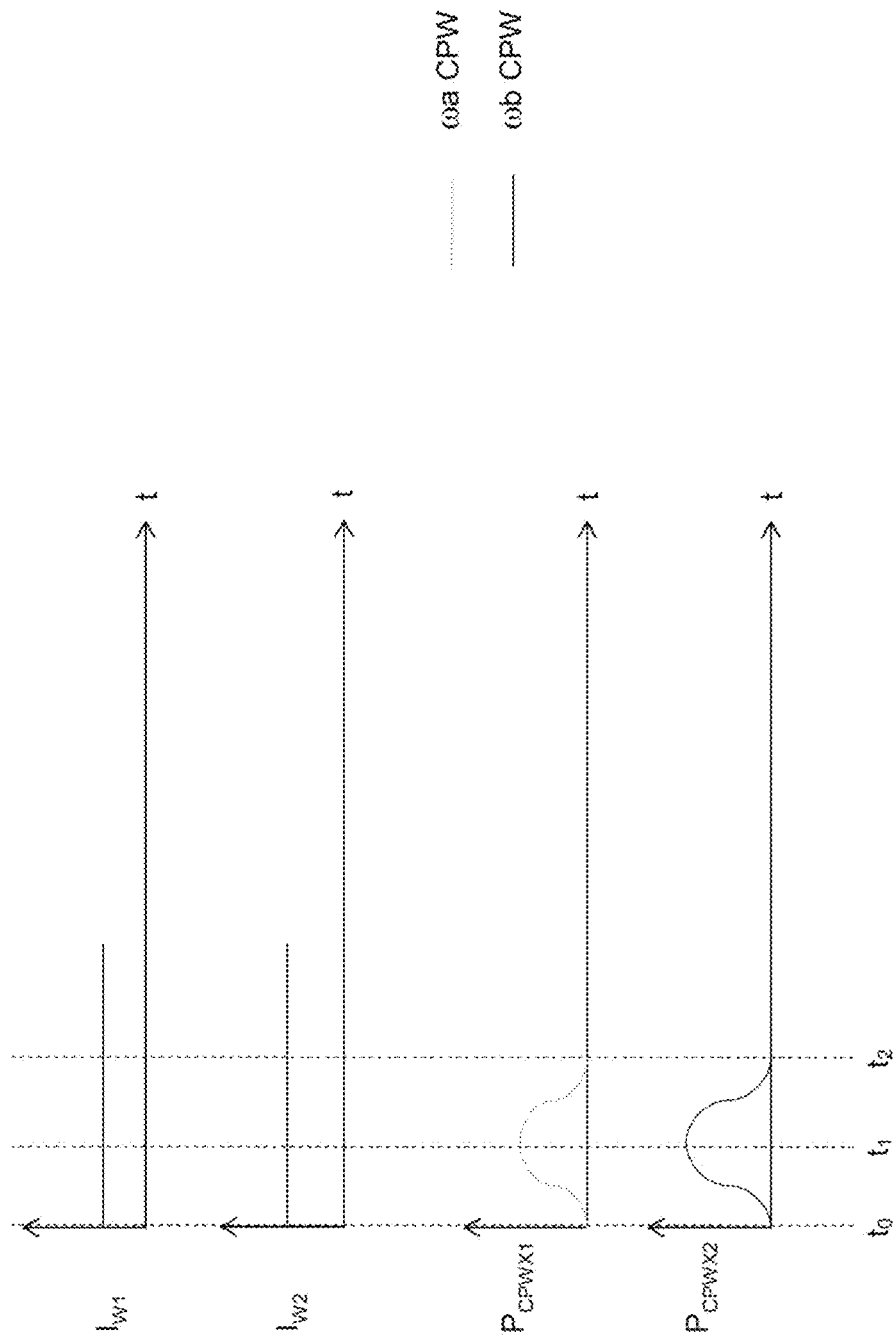
FIG. 20 illustrates the timing diagram associated with the movements of the clouds from FIG. 19.

This same sensor also allows a clock measurement and an acceleration measurement along the two axes X and Y'. To measure an acceleration along a measurement axis, it is necessary to make the two clouds pass through a straight segment perpendicular to the measurement axis. By way of example, FIG. 19 illustrates the movement of the clouds for the measurement of ax and FIG. 20 illustrates the associated timing diagram. The single-frequency signal is simply used on each guide along X to separate the two clouds.

According to a third aspect, the invention relates to a method for measuring a rotational velocity about an axis X, Y' or Z, called measurement axis, for example an ultra-cold atom sensor comprising an atom chip according to the invention. The method comprises the steps of:

A Generating a cloud of said ultra-cold atoms, including phases of dispersing said atoms, of cooling said atoms, of initializing said atoms in at least one internal state |a> and of trapping a cloud of said ultra-cold atoms in a local potential minimum, said trapping being achieved through the flow of DC currents through the first and the second strip, B Initializing the internal states by coherently superposing said ultra-cold atoms between said state |a> and an internal state |b> through a first pulse π/2;

C Spatially separating a cloud of said atoms with said internal state |a> in a trap T1 from a cloud of said atoms with said internal state |b> in another trap T2, and moving said traps in opposing directions along a closed path contained within a plane perpendicular to the measurement axis and initialized from the point O, by applying a predetermined microwave-frequency current or voltage to the waveguides in a predetermined sequence, and by applying a constant DC current or voltage value to the first and second strips, D Recombining the internal states |a> and |b> by applying a second pulse π/2 to the ultra-cold atoms and then measuring the number of atoms in an internal state chosen from among at least |a> and |b>;

E Determining the Sagnac phase of said ultra-cold atoms and calculating the rotational velocity of said sensor along said measurement axis.

In order to measure a rotational velocity about the axis Z, during step C, the sequence includes applying, at certain times, a microwave signal formed by the superposition of a microwave signal at an angular frequency ωa and a microwave signal with an angular frequency ωb to one of the guides along X of the first pair, or applying a microwave signal formed by the superposition of a microwave signal at an angular frequency ωa' and a microwave signal with an angular frequency ωb' to one of the guides along Y' of the second pair.

In order to measure a rotational velocity about the axis X or the axis Y', the sequence includes:

in order to measure the rotational velocity about the axis X, applying, at certain times, a microwave signal formed by the superposition of a microwave signal at an angular frequency ωa and a microwave signal with an angular frequency ωb, simultaneously to the two guides along X of the first pair, in order to measure the rotational velocity about the axis Y', applying, at certain times, a microwave signal formed by the superposition of a microwave signal at an angular frequency ωa' and a microwave signal with an angular frequency ωb', simultaneously to the two guides along Y' of the second pair.

During free evolution step C, the microwave powers applied to the various waveguides depend on the measurement axis (X, Y' or Z) and the type of measurement (clock, acceleration, rotational velocity) that are chosen.

Figure 21:
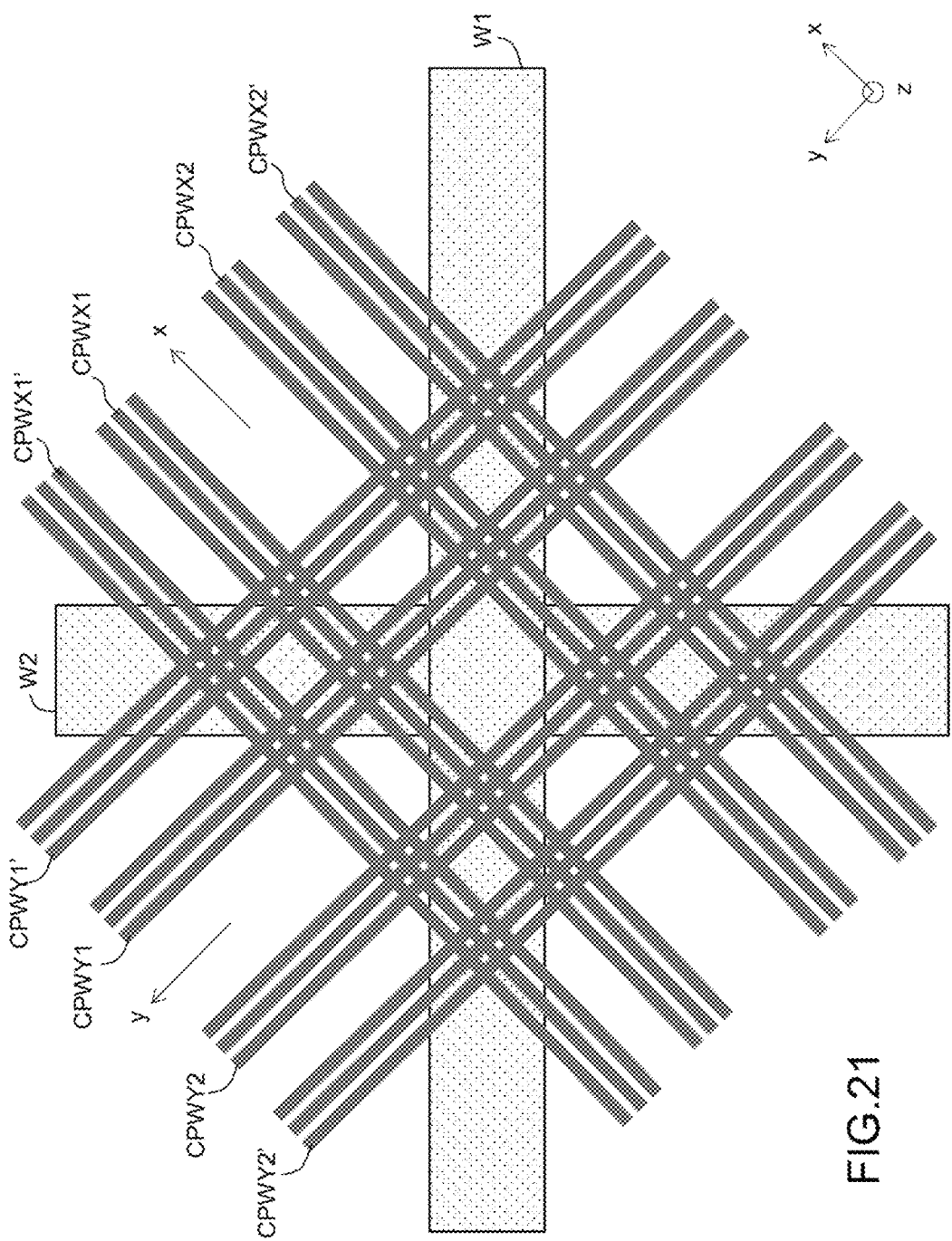
FIG. 21 illustrates a first chip variant according to the invention.

According to a first variant, the atom chip Ach according to the invention comprises at least one additional pair of waveguides along X that are further away from the axis X than the first pair and at least one additional pair of waveguides along Y that are further away from the axis Y than the second pair. One example of an atom chip according to this variant is illustrated in FIG. 21 with an additional pair along X (CPWX1', CPWX2') and an additional pair along Y (in the example Y'=Y) (CPWY1, CPWY2). Generally speaking, the number of additional pairs along X is not equal to the number of additional pairs along Y'. For issues of symmetry of the potential, the addition of a single waveguide and not a pair is of no benefit for an acceleration or rotational velocity measurement.

The inventors have shown that such an architecture makes it possible to increase the dimensions of the measurement paths TX, TY' and TZ, and therefore to increase the sensitivity of the sensor.

Figure 22:
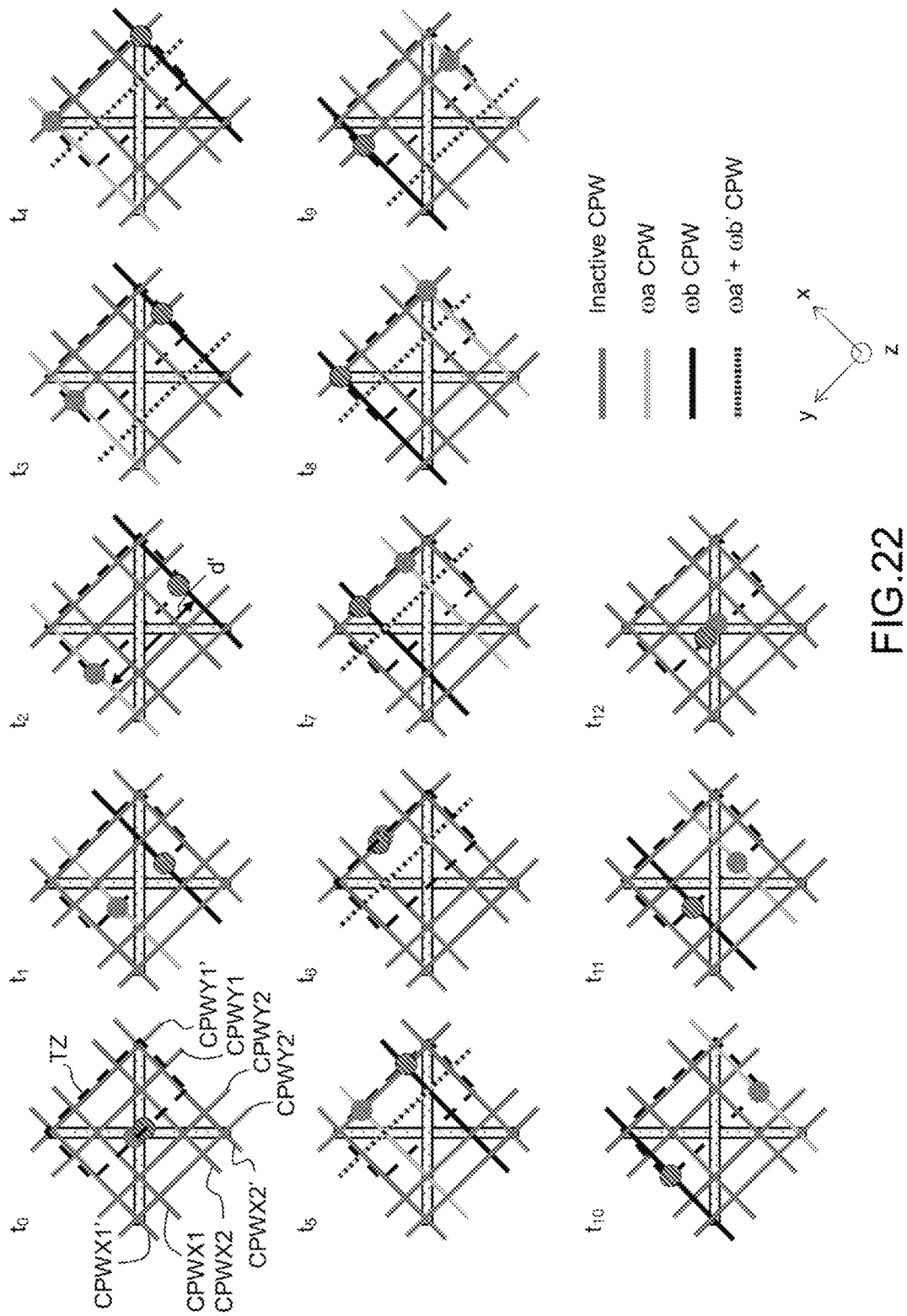
FIG. 22 illustrates a first example of the movements of the clouds for creating a path TZ with a chip according to the first variant.
Figure 23:
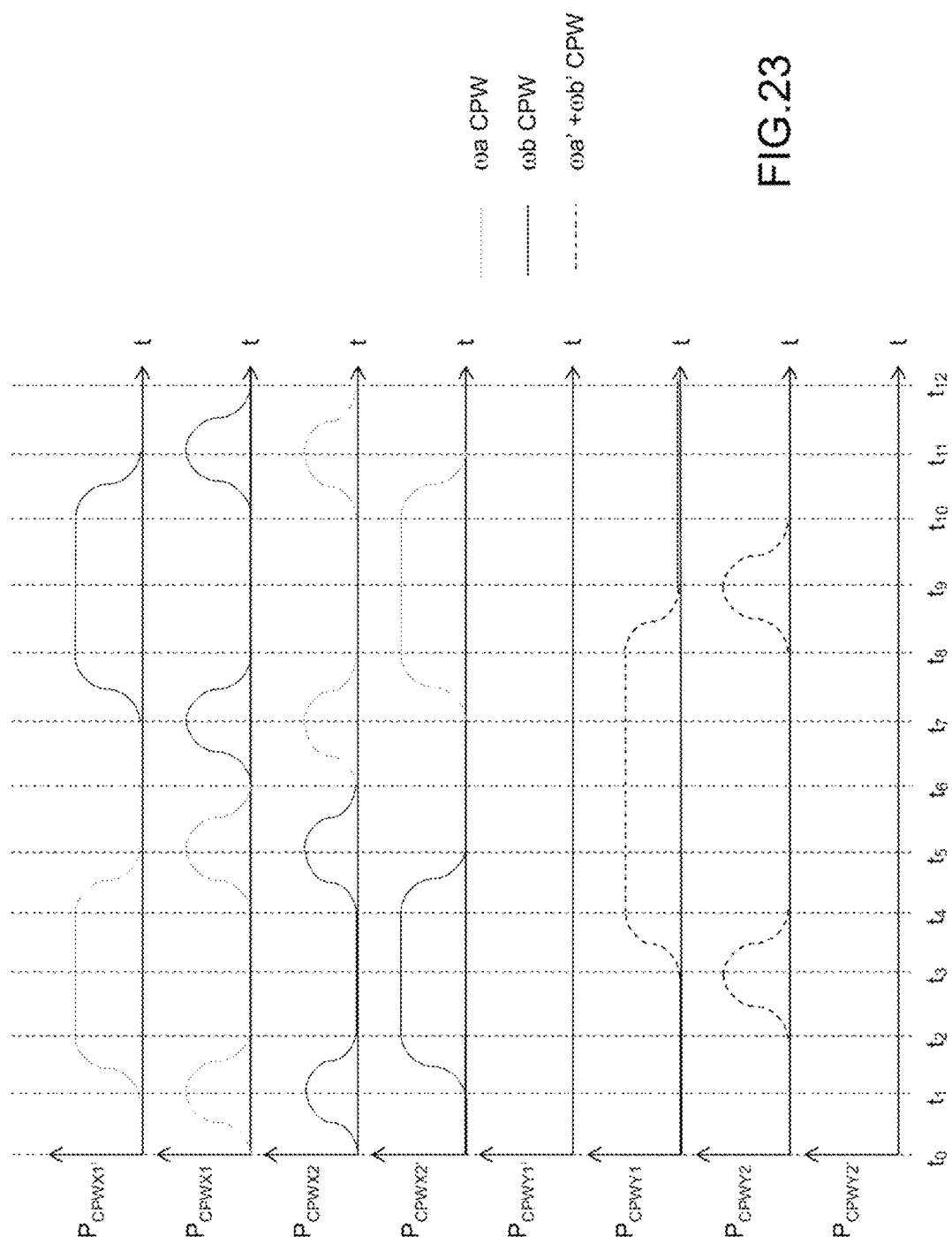
FIG. 23 illustrates the timing diagram associated with the movements of the clouds from FIG. 22.

A first example of measuring the rotational velocity along Z Ωz is illustrated in FIG. 22 (spatial movement of the clouds) and the associated timing diagram is given in FIG. 23. In this example, the measurement is performed by separating along X and repelling along Y. The conventions regarding the greyscales and the lines are identical to those for FIGS. 10-13 and 15-20. The additional pair along X makes it possible to separate the atoms by a distance d' greater than the previous distance d, by activating the additional waveguides along X at different times from the activation times of the guides (CPWX1, CPWX2).

The guides (CPWX1', CPWX2') are activated with respectively (ωa, ωb) at t2 after activation of the guides (CPWX1, CPWX2) at t1.

Next, at t3, a guide along Y is activated with a sum signal [a'+b'], here CPWY2, so as to repel the clouds from the opposite side, as explained above. To further increase the dimension of TZ from t3 to t4 CPWY2 is deactivated while CPWY1 is activated, thereby repelling the atoms even further towards positive xs, in the same way as in FIG. 11bis. According to one option (not shown), CPWY1 is deactivated and CPWY1' is activated so as to move the clouds even further apart. It is not absolutely necessary to deactivate one guide before activating the following one, but keeping the previous guide activated has only a slight advantage and consumes microwave power.

The atoms are then moved closer to X by deactivating CPWX1' and CPWX2' and activating CPWX1 and CPWX2 (t4 to t5) and then the clouds meet up while deactivating CPWX1 and CPWX2 (t5 to t6). The guide CPWY2' is kept activated with the sum signal in order to keep the atoms repelled. Then, by inverting the frequencies and by adopting the same principles, the second part of the path is travelled by each cloud (t7 to t12). According to another example, after t4, it is also possible to continue to repel the atoms towards positive xs while activating the guide CPWY1' with the sum signal.

Figure 24:
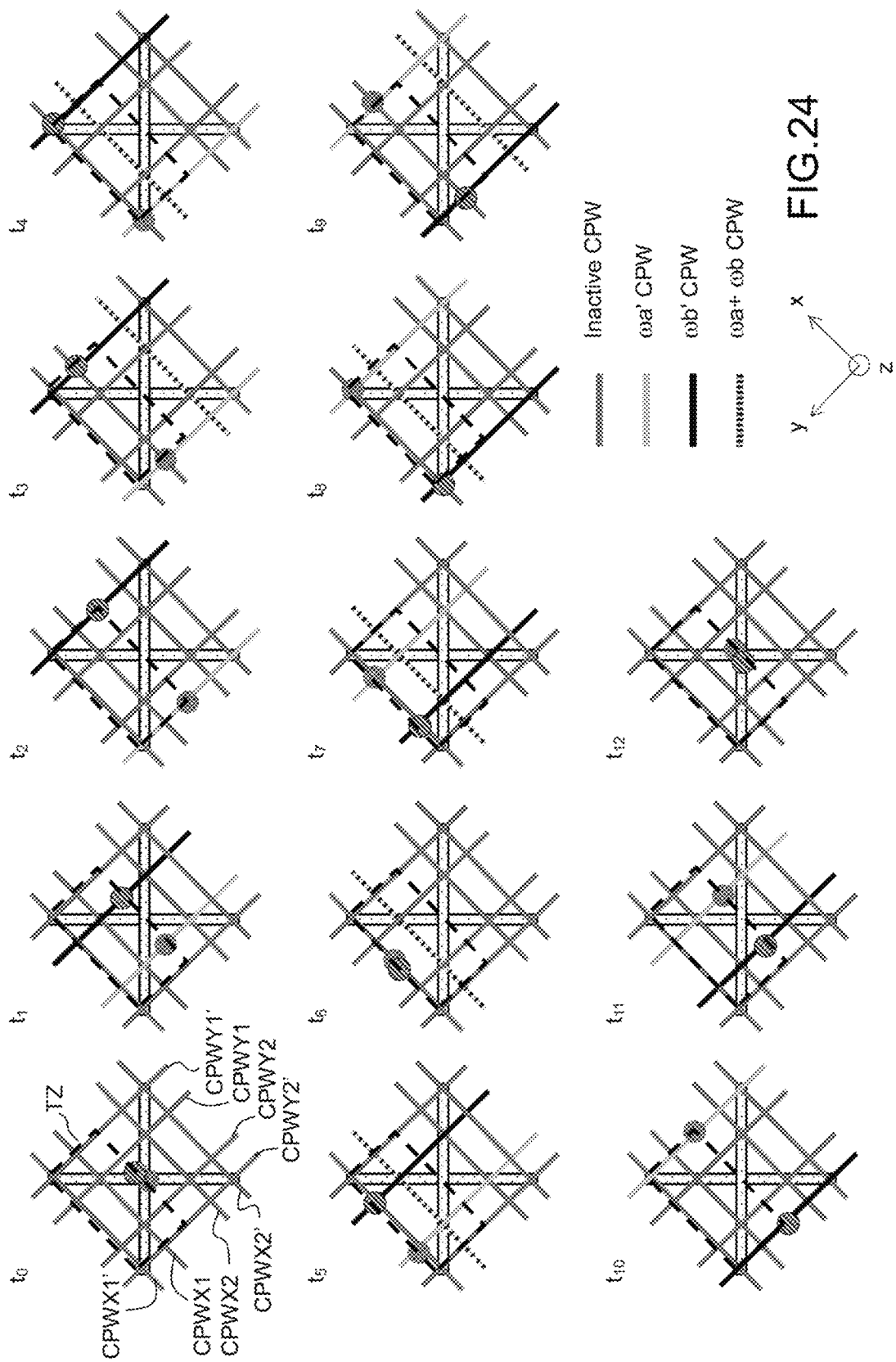
FIG. 24 illustrates a second example of the movements of the clouds for creating a path TZ with a chip according to the first variant.
Figure 25:
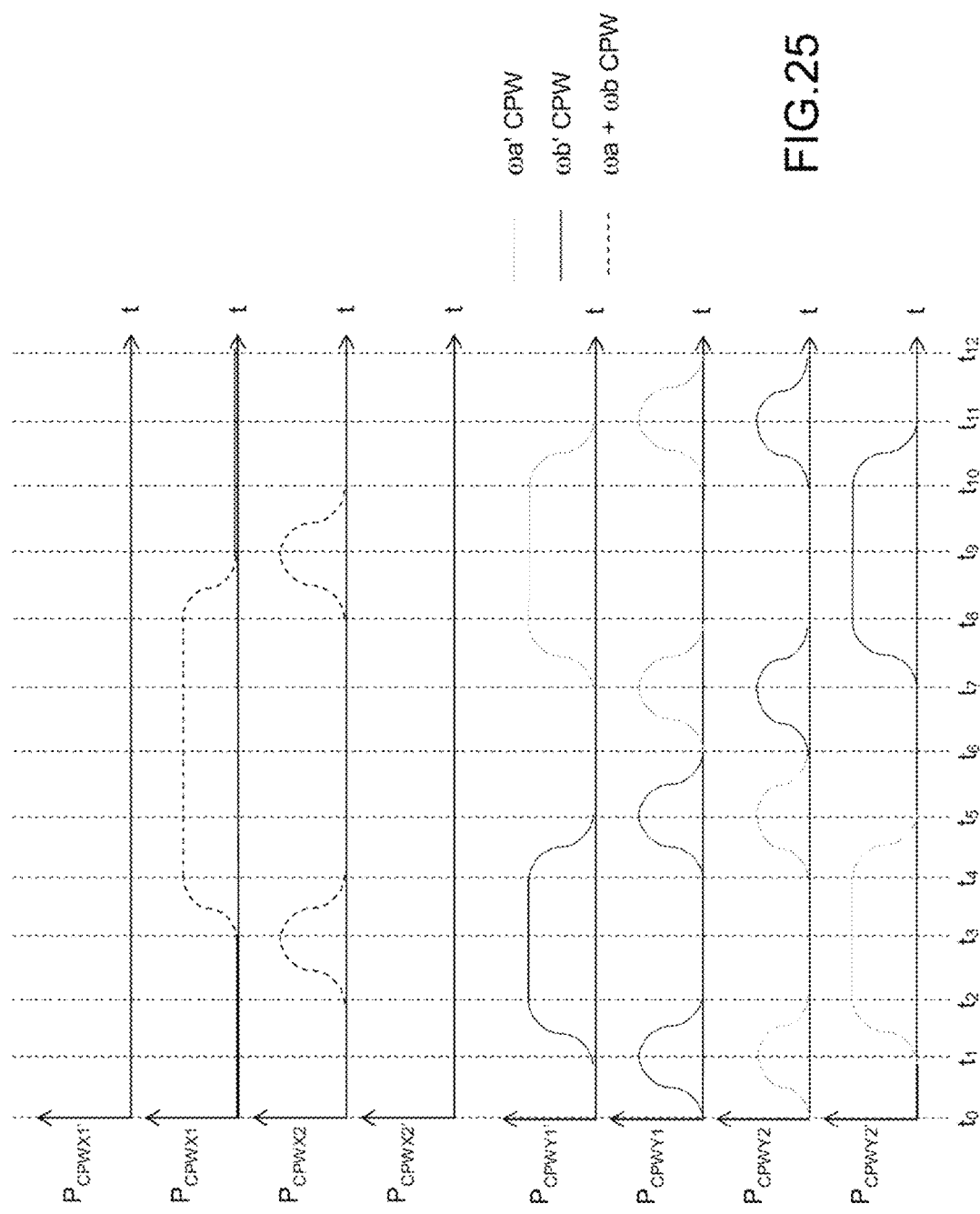
FIG. 25 illustrates the timing diagram associated with the movements of the clouds from FIG. 24.

Likewise, Ωz may be measured, according to a second example, by separating along Y and repelling along X, as illustrated in FIG. 24 for the spatial movement of the clouds and FIG. 25 for the associated timing diagram.

Thus, when implementing a sensor comprising this first atom chip variant, the guides along X (respectively Y' depending on the chosen example) of the at least one additional pair are also passed through simultaneously by microwave signals with angular frequencies ωa or ωb (respectively ωa' or ωb'), at certain times different from the first set of times for which it is the guides along X of the first initial pair (respectively the guides along Y' of the second initial pair) that are activated.

With the chip according to the first variant, it is also possible to perform a rotational velocity measurement along the axis X or along the axis Y' by adopting the interferometry sequence illustrated in FIGS. 15 and 17, with the following modifications, also making it possible here to increase the dimension of the paths TX and TY' and therefore the sensitivity of the measurement.

Figure 26:
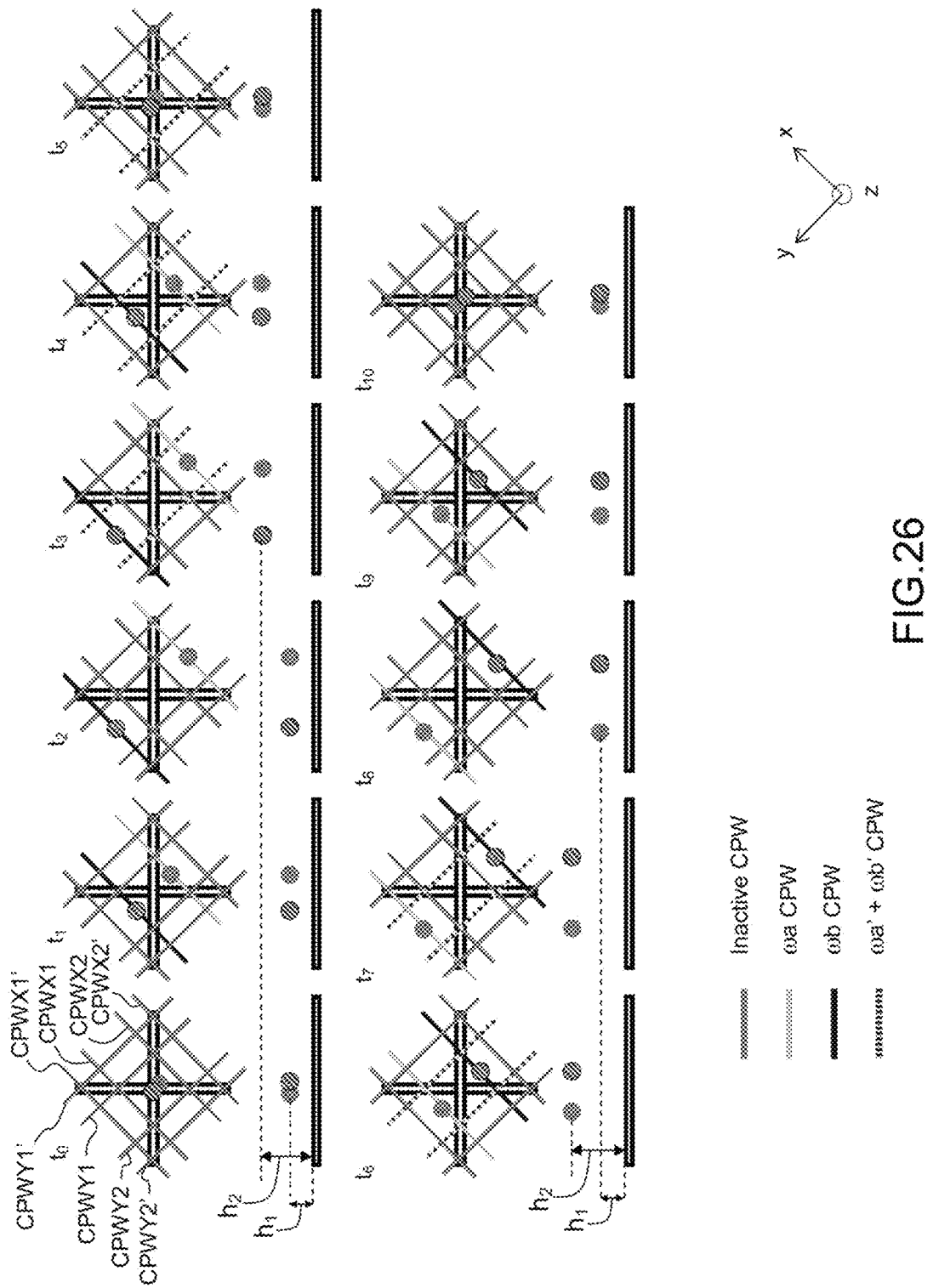
FIG. 26 illustrates one example of the movements of the clouds for creating a path TX with a chip according to the first variant.
Figure 27:
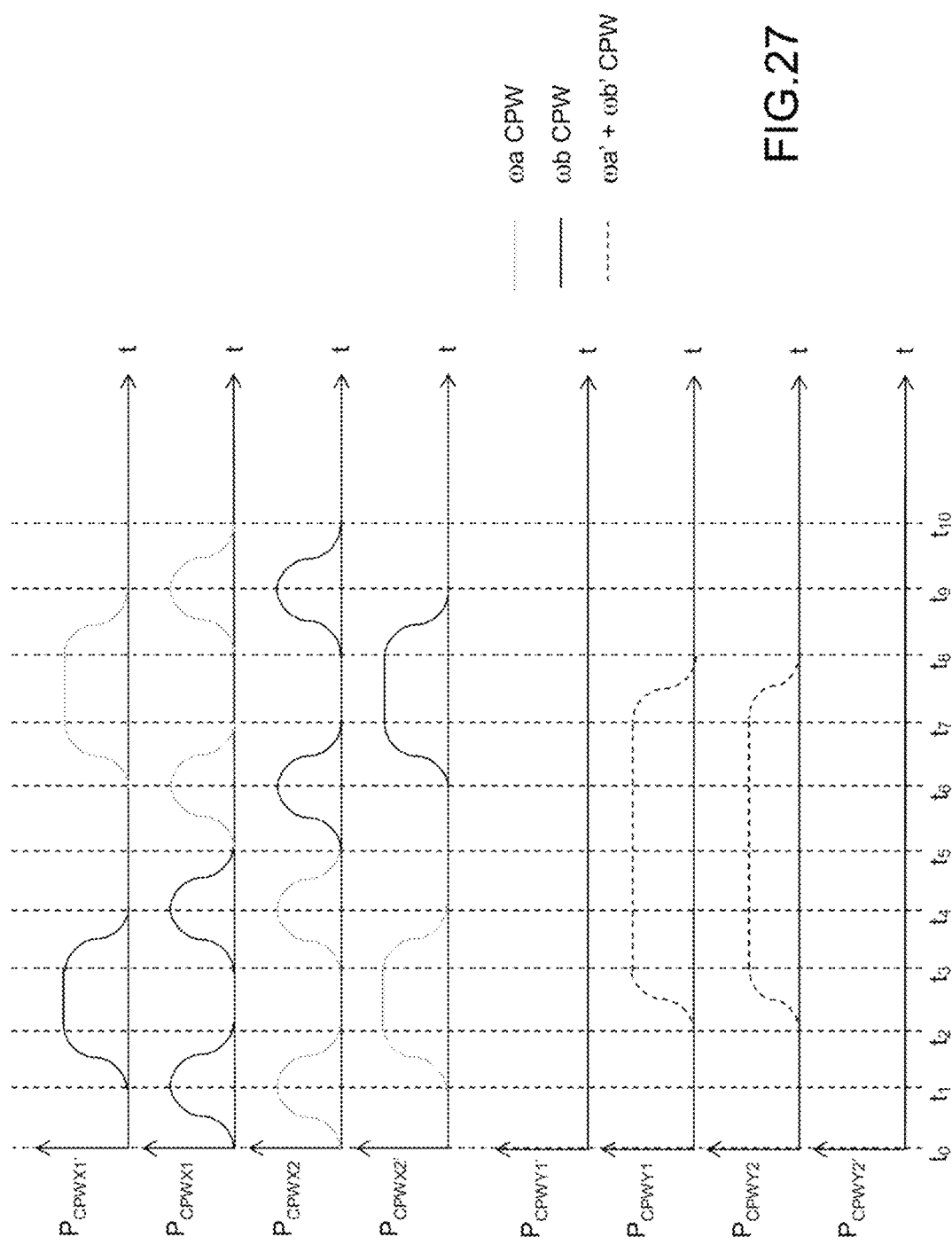
FIG. 27 illustrates the timing diagram associated with the movements of the clouds from FIG. 26.

To measure Ωx, the clouds are separated to a greater extent, by an initial distance d'>d, by activating, at t2, the guides along X of the additional pair, as already explained in FIG. 22, and as illustrated in FIG. 26 for the spatial movement of the clouds and FIG. 27 for the associated timing diagram. At t3, as explained in FIGS. 15 and 17, the guides along Y of the first pair are activated so as to "push up" the two clouds of atoms. According to one option (not shown), the two outer guides along Y CPWY1' and CPWY2' are also activated with a sum signal. The clouds then rise slightly higher.

Figure 28:
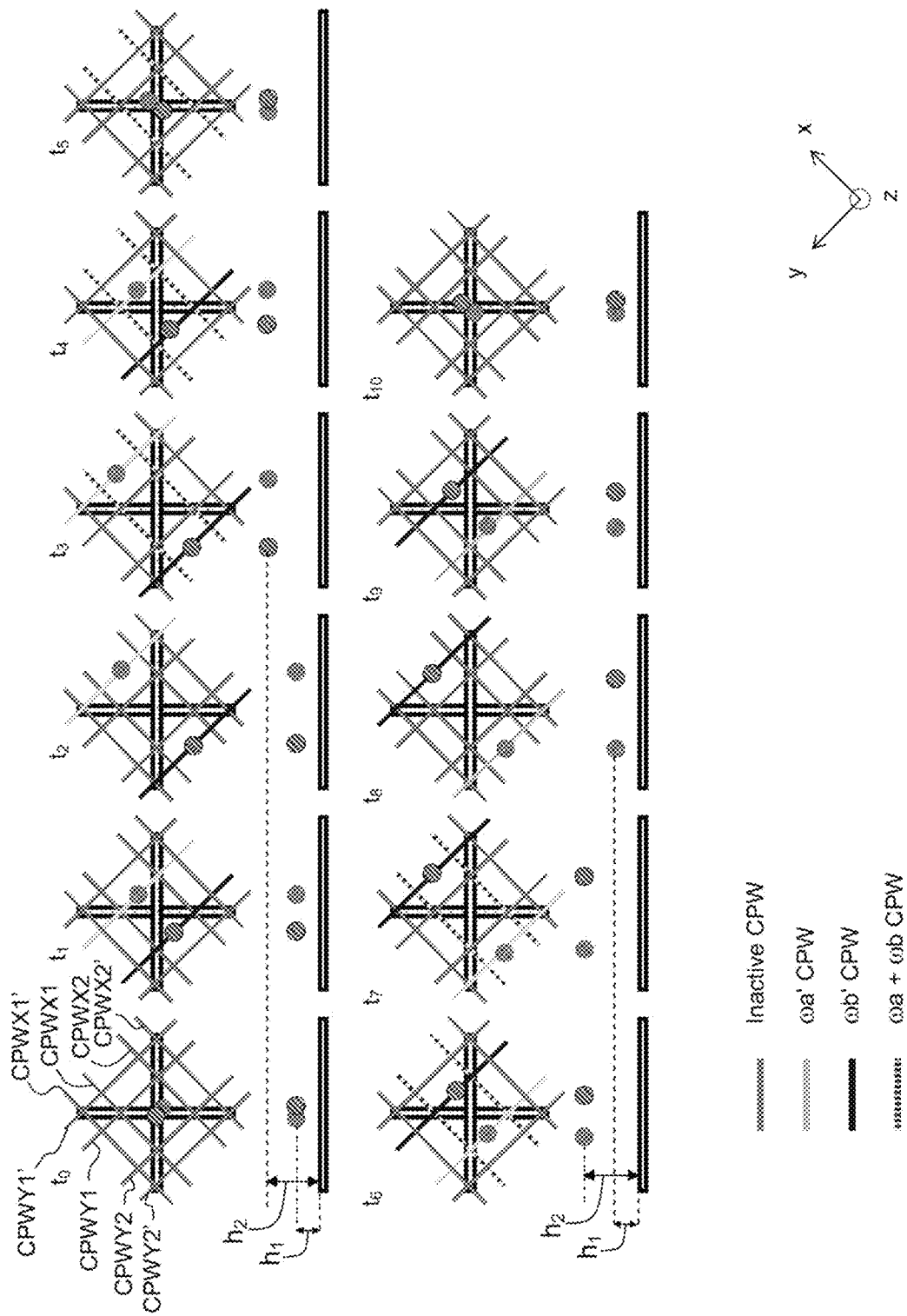
FIG. 28 illustrates one example of the movements of the clouds for creating a path TY with a chip according to the first variant.
Figure 29:
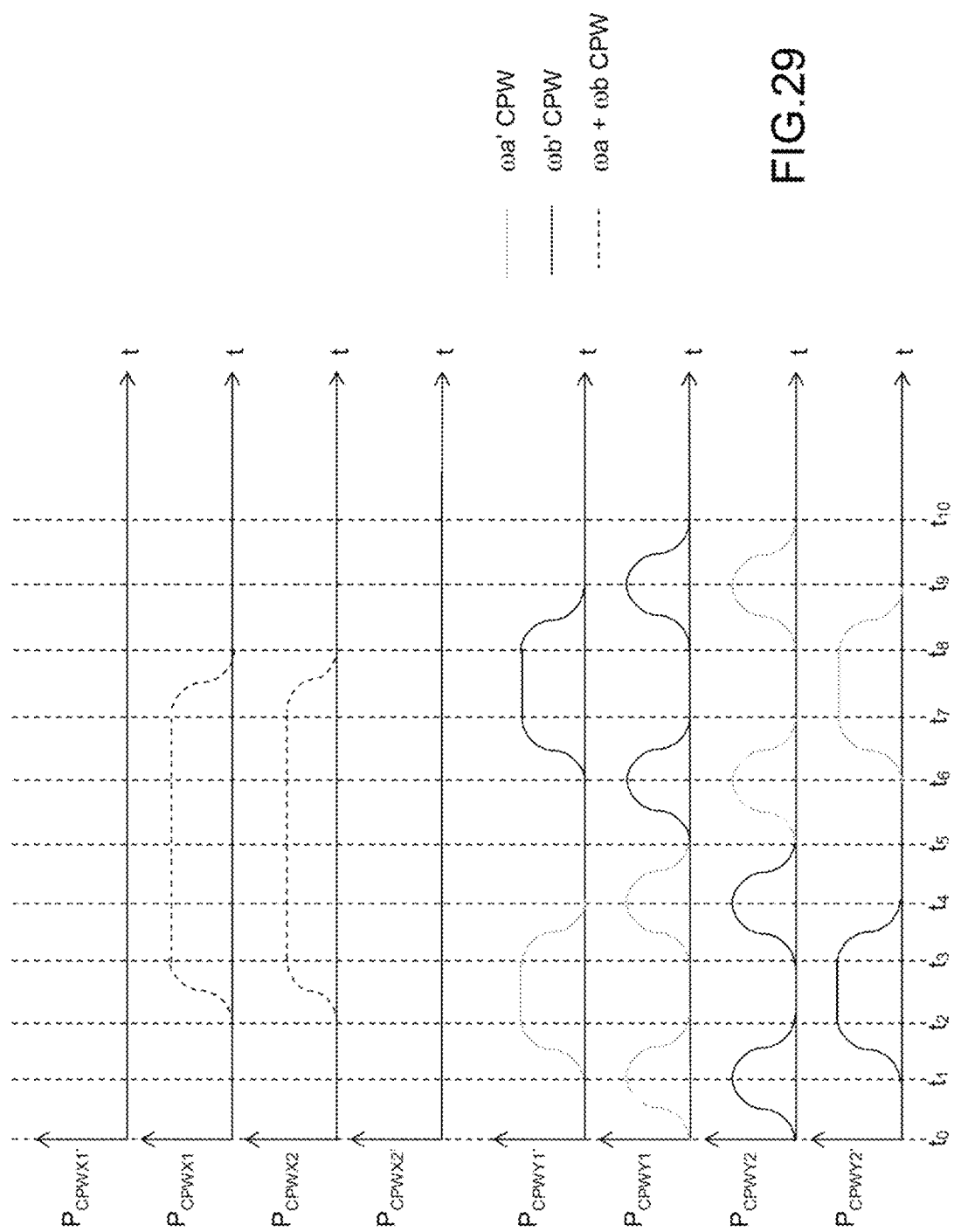
FIG. 29 illustrates the timing diagram associated with the movements of the clouds from FIG. 28.

Likewise, FIGS. 28 and 29 illustrate the spatial movement of the clouds and the associated timing diagram for a rotational velocity measurement along the axis Y according to the same principle.

An acceleration measurement ax or ay also benefits in the same way from increasing the length of the straight segment for the measurement.

Figure 30:
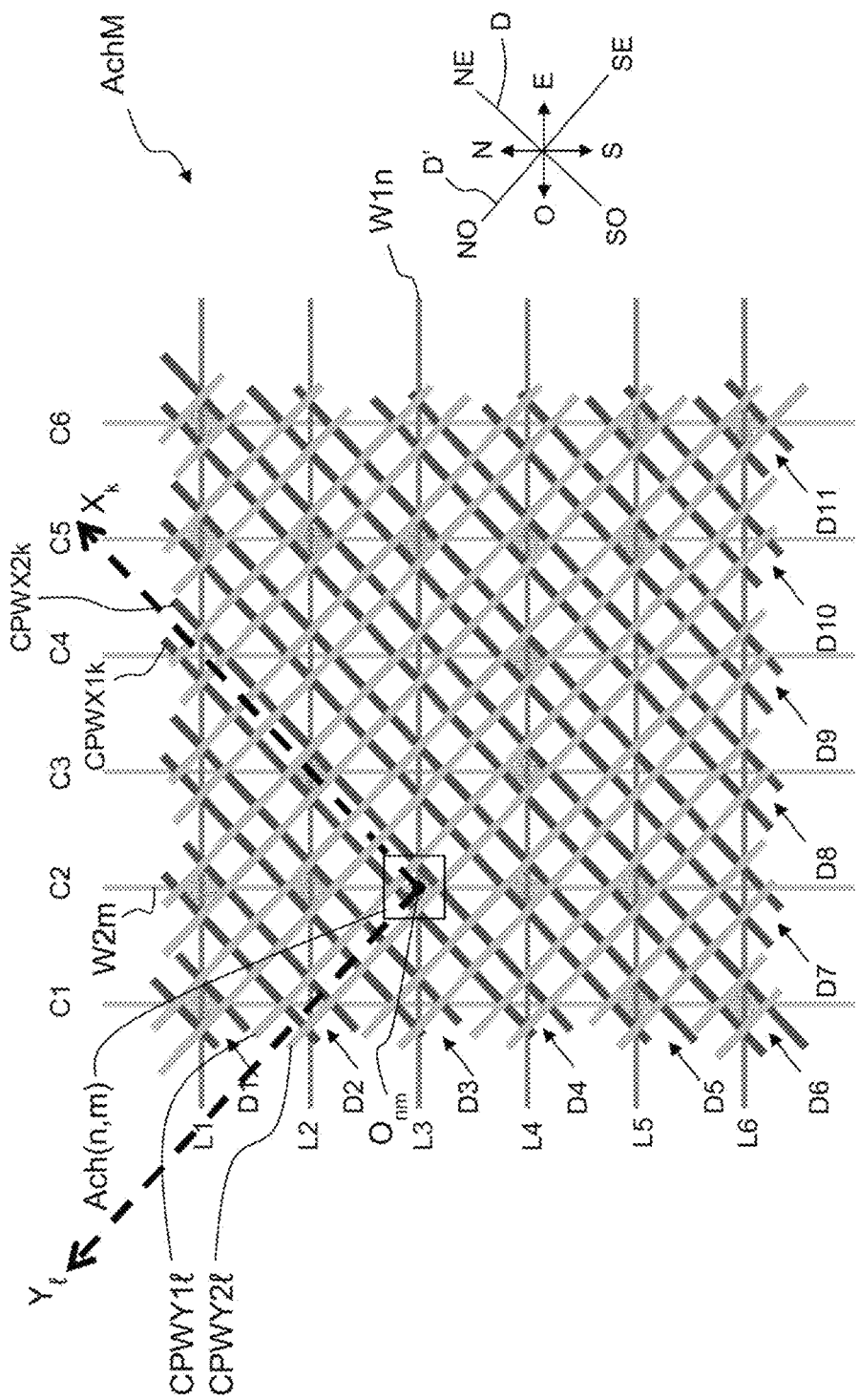
FIG. 30 illustrates a matrix atom chip according to the invention.

According to a second variant, the chip according to the invention is a matrix atom chip AchM as described in FIG. 30. It comprises a first set of N first conductive strips W1n indexed n (N wires) and a second set of M second conductive strips W2m indexed m (M wires) that are perpendicular to one another and respectively form rows and columns of a matrix. FIG. 30 illustrates one example in which N=M=6. The strips of the first set are electrically insulated from the strips of the second set.

Each pixel (n, m) of the matrix forms an elementary chip Ach(n,m) as described in FIG. 9. The elementary chips arranged in a matrix are located on the same substrate.

Axes Xk indexed k are defined along first diagonals Dk of the matrix, which form the South-West/North-East (SW/NE) diagonals of the matrix, also considering the "diagonals" at the extreme points (1, 1), (N, M). Axes Yl indexed l are also defined along second diagonals D'l perpendicular to the first diagonals, which form the South-East/North-West (SE/NW) diagonals of the matrix, also considering the "diagonals" at the extreme points (1, N), (M, 1). There are M+N−1 diagonals Dk (SW/NE) and M+N−1 diagonals D'l (SE/NW).

The matrix chip also comprises second pairs of waveguides (CPWX1, CPWX2) along each axis Xk and second pairs of waveguides (CPWY1, CPWY2) along each axis Yl. Thus, a first guide pair along Xk is common to all of the pixels of the diagonal Dk of the matrix and a second pair of guides along Yl is common to all of the pixels of the diagonal D'l of said matrix.

Each pixel of the matrix then forms an elementary chip Ach(n,m) as described above (see FIG. 9). The elementary chips arranged in a matrix are located on the same substrate.

Preferably, the matrix chip comprises 4 levels, each level comprising the elements of a type chosen from among: guides coplanar along Xk, guides coplanar along Yl, first conductive strips, second conductive strips. The upper plane (measurement plane) is preferably occupied by waveguides.

The matrix atom chip AchM according to the invention is compatible with the first chip variant. In this case, the matrix chip furthermore comprises: for each axis Xk, at least one additional pair of waveguides along Xk that are further away from the axis Xk than the first pair, for each axis Yl, at least one additional pair of waveguides along Yl that are further away from the axis Yl than the second pair.

According to another aspect, the invention relates to an ultra-cold atom sensor integrating a matrix chip according to the invention. Integrated into a sensor, the elementary chips make it possible to perform, in parallel, multiple measurements of at least one variable chosen from among: ax, ay, Ωx, Ωy, Ωz. They may also measure a time t. The measurements performed in parallel take into account the sequences applied to the waveguides.

The elementary chips are also reconfigurable so as to be able to perform other measurements in another sequence. The matrix chip is reconfigured according to requirements: the desired type of measurement (ax, ay, Ωx, Ωy, Ωz, t), the desired accuracy (dependent on the number of chips simultaneously performing the measurement), etc. Parallel, redundant and/or additional measurements are thus performed on one and the same matrix chip.

The invention claimed is:

1. An atom chip (Ach) for an ultra-cold atom sensor, comprising a measurement plane XY defined by an axis X and an axis Y that are orthogonal, said measurement plane being normal to an axis Z, the atom chip comprising:
   a first pair of waveguides consisting of a first and a second waveguide (CPWX1, CPWX2) that are coplanar, parallel to one another and arranged symmetrically on either side of an axis whose projection in the plane XY is along the axis X, called guides along X,
   a second pair of waveguides consisting of a first and a second waveguide (CPWY'1, CPWY'2) that are coplanar, parallel to one another and arranged symmetrically on either side of an axis whose projection in the plane XY is along an axis Y' different from the axis X, called guides along Y',
   the guides along X being electrically insulated from the guides along Y';
   the projections of the guides along X and the guides along Y' in the plane XY forming, at their intersection, a first parallelogram (P1) with a centre O and having a first surface (S1),
   a first conductive strip (W1) and a second conductive strip (W2) arranged such that their respective projection in the plane XY forms, at their intersection, a second parallelogram (P2) also with a centre O and having a second surface (S2), said strips being designed to be flowed through by DC currents,
   an intersection between the first (S1) and the second (S2) surface being greater than or equal to 40% of the first surface (S1).

2. The atom chip according to claim 1, wherein the first and the second strip are respectively oriented along a first (D1) and a second (D2) diagonal of said first parallelogram.

3. The atom chip according to claim 1, wherein the first (W1) and the second (W2) strip are perpendicular to one another.

4. The atom chip according to claim 1, wherein said second pair of waveguides is perpendicular to said first pair of waveguides, the axis Y' then being coincident with the axis Y.

5. The atom chip according to claim 1, wherein said strips are perpendicular to one another and said pairs of waveguides are perpendicular to one another and oriented at 45° from said strips.

6. The atom chip (Ach) for an ultra-cold atom sensor according to claim 1, comprising:
   at least one additional pair of guides along X that are further away from the axis X than the first pair, and
   at least one additional pair of guides along Y' that are further away from the axis Y' than the second pair.

7. An ultra-cold atom sensor allowing a rotational velocity ($\Omega_z$) measurement along at least the axis Z comprising:
   an atom chip (ACh) according to claim 1 placed in a vacuum chamber,
   an atom source (S) designed to generate a cloud of ultra-cold atoms close to said plane XY of said atom chip,
   said ultra-cold atoms having, in the phase of initializing the implementation of the sensor, a superposition of internal states $|a\rangle$ and $|b\rangle$
   a generator (GB) for generating a homogeneous magnetic field (B0),
   at least one processor (UT), at least one DC current or voltage generator (GDC) connected to said strips and at least one microwave current or voltage generator (GMW) connected to said waveguides,
   said waveguides and said strips being configured, in the phase of implementing the sensor, so as to:
      modify the energy of said ultra-cold atoms so as to create a potential minimum for the ultra-cold atoms in the internal state $|a\rangle$ and a potential minimum for the ultra-cold atoms in the internal state $|b\rangle$, thus forming a first (T1) and second (T2) ultra-cold atom trap, a trap making it possible to immobilize a cloud of ultra-cold atoms in an internal state different from the other trap, at a controlled distance from said measurement plane, and
      spatially separate the two traps and move said traps (T1, T2) along at least one first closed path (TZ) contained within a plane perpendicular to Z, and travelled in one direction by the ultra-cold atoms of the first trap and in the opposite direction by the ultra-cold atoms of the second trap,
   the sensor furthermore comprising an optical intensity detection system (SDET) designed to measure at least one population of said ultra-cold atoms in one said internal state.

8. The ultra-cold atom sensor according to claim 7, wherein, in the sequence of separating and moving said traps:
   the guides along X of the first pair are passed through simultaneously by microwave signals with angular frequencies ωa or ωb, at certain times called first set of times,
   at least one of the guides along Y' of the second pair is passed through by a microwave signal formed by the superposition of a microwave signal at an angular frequency ωa' and a microwave signal with an angular frequency ωb', at certain times called second set of times having times in common with the first set of times,
   the strips each being flowed through by a constant current during the separation, the movement and the recombination of said traps,
   where applicable the guides along X of said at least one additional pair are also successively passed through simultaneously by microwave signals with angular frequencies ωa or ωb, at certain times different from the first set of times.

9. The ultra-cold atom sensor according to claim 7, wherein, in the sequence of separating and moving said traps:
   the guides along Y' of the second pair are passed through simultaneously by microwave signals with angular frequencies ωa' or ωb', at certain times called first set of times,
   at least one of the guides along X of the first pair is passed through by a microwave signal formed by the superposition of a microwave signal at an angular frequency ωa and a microwave signal with an angular frequency ωb, at certain times called second set of times having times in common with the first set of times,
   the first and second strips each being flowed through by a constant current during the separation, the movement and the recombination of said traps,
   where applicable the guides along Y' of the at least one additional pair are also passed through simultaneously by microwave signals with angular frequencies ωa' or ωb', at certain times different from the first set of times.

10. The ultra-cold atom sensor according to claim 7, furthermore allowing a rotational velocity measurement along the axes X and Y',
   wherein said waveguides and said strips are furthermore configured so as
      to move said traps (T1, T2) along a second closed path (TX) contained within a plane perpendicular to X, during the rotational velocity ($\Omega x$) measurement along the axis X,
      to move said traps (T1, T2) along a third closed path (TY') contained within a plane perpendicular to Y', during the rotational velocity ($\Omega y'$) measurement along the axis Y',
      said closed paths being travelled in one direction by the ultra-cold atoms of the first trap and in the opposite direction by the ultra-cold atoms of the second trap, the second and third paths each comprising at least one first portion located at a first height (h1) from the plane XY and a second portion located at a second height (h2) strictly greater than the first height.

11. A sensor according to claim 10, wherein, when implementing the measurement of the rotational velocity ($\Omega x$) along the axis X by generating the second closed path (TX),
   the guides along X of the first pair are passed through simultaneously by microwave signals with angular frequencies ωa or ωb, at certain times called third set of times,
   the guides along Y' of the second pair are simultaneously passed through by a microwave signal formed by the superposition of a microwave signal at an angular frequency ωa' and a microwave signal with an angular frequency ωb' in order to switch from the first height to the second height, at certain times called fourth set of times having times in common with the third set of times, the first and second strips are each flowed through by a constant current during the separation, the movement and the recombination of said traps, where applicable the guides along X of said at least one additional pair are also passed through simultaneously by microwave signals with angular frequencies ωa or ωb, at certain times different from the third set of times.

12. The sensor according to claim 10, wherein, when implementing the measurement of the rotational velocity (Ωy') along the axis Y' by generating the third closed path (TY'), the guides along Y' of the second pair are passed through simultaneously by microwave signals with angular frequencies ωa' or ωb', at certain times called third set of times, the waveguides along X of the first pair are simultaneously passed through by a microwave signal formed by the superposition of a microwave signal at an angular frequency ωa and a microwave signal with an angular frequency ωb in order to switch from the first height to the second height, at certain times called fourth set of times having times in common with the third set of times, the first and second strips are each flowed through by a constant current during the separation, the movement and the recombination of said traps, where applicable the guides along Y' of said at least one additional pair are also passed through simultaneously by microwave signals with angular frequencies ωa' or ωb', at certain times different from the third set of times.

13. A matrix atom chip (AchM) according to claim 1, comprising:

a first set of N first conductive strips (W1n) indexed n and a second set of M second conductive strips (W2m) indexed m that are perpendicular to one another and respectively form N rows and M columns of a matrix, the strips of the first set being electrically insulated from the strips of the second set, axes Xk indexed k are defined along first diagonals (Dk) of the matrix and axes Yl indexed I are defined along second diagonals (D'I) perpendicular to the first diagonals, the matrix chip also comprising first pairs of waveguides along each axis Xk and second pairs of waveguides along each axis Yl, each pixel of the matrix forming an elementary chip (Ach(n,m)).

14. The matrix atom chip according to claim 13, furthermore comprising:

for each axis Xk, at least one additional pair of guides along Xk that is further away from the axis Xk than the first pair, for each axis Yl, at least one additional pair of guides along Yl that is further away from the axis Yl than the second pair.

15. An ultra-cold atom sensor comprising:
a matrix atom chip according to claim 13,
an atom source (S) designed to generate a cloud of ultra-cold atoms close to said plane XY of said atom chip,
a generator (GB) for generating a homogeneous magnetic field (B0),
at least one processor (UT), at least one DC current or voltage generator (GDC) designed to control electric currents in said strips, and at least one microwave current or voltage generator (GMW) connected to said waveguides, an optical intensity detection system (SDET), the sensor being designed to measure, according to requirements and in a reconfigurable manner, at least one acceleration (ax, ay) and/or rotational velocity (Ωx, Ωy, Ωz) in a direction corresponding to that of the axis Xk and/or the axis Yl, and/or a rotational velocity (Ωz) along the axis Z, from said elementary chips.

16. A method for measuring a rotational velocity about at least one axis called measurement axis, using an ultra-cold atom sensor comprising an atom chip, said atom chip being placed in a vacuum chamber and comprising a measurement plane XY defined by an axis Z and an axis Y that are orthogonal, said measurement plane being normal to an axis Z, the atom chip comprising:

a first pair of waveguides consisting of a first and a second waveguide (CPWX1, CPWX2) that are coplanar, parallel to one another and arranged symmetrically on either side of an axis whose projection in the plane XY is along the axis X, called guides along X, a second pair of waveguides consisting of a first and a second waveguide (CPWY'1, CPWY'2) that are coplanar, parallel to one another and arranged symmetrically on either side of an axis whose projection in the plane XY is along an axis Y', called guides along Y', the guides along X being electrically insulated from the guides along Y'; the projections of the guides along X and the guides along Y' in the plane XY forming, at their intersection, a first parallelogram (P1) with a centre O and having a first surface (S1), a first conductive strip (W1) and a second conductive strip (W2) arranged such that their respective projection in the plane XY forms, at their intersection, a second parallelogram (P2) also with a centre O and having a second surface (S2), said strips being designed to be flowed through by DC currents, an intersection between the first and the second surface being greater than or equal to 40% of the first surface (S1), the method comprising, for measuring the rotational velocity along Z, the steps of:

A: generating a cloud of said ultra-cold atoms, including phases of dispersing said atoms, of cooling said atoms, of initializing said atoms in at least one internal state |a> and of trapping a cloud of said ultra-cold atoms in a local potential minimum, said trapping being achieved through the flow of DC currents through the first and the second strip;

B: initializing internal states by coherently superposing said ultra-cold atoms between said state |a> and an internal state |b> different from |a> through a first pulse π/2;

C: spatially separating a cloud of said atoms with said internal state |a> in a trap (T1) from a cloud of said atoms with said internal state |b> in another trap (T2), and moving said traps in opposing directions along a closed path contained within a plane perpendicular to the measurement axis and initialized from the point O: by applying a predetermined microwave-frequency current or voltage to said waveguides in a predetermined sequence, and by applying a constant DC current or voltage value to the first and second strips;

D: recombining said internal states |a> and |b> by applying a second pulse π/2 to said ultra-cold atoms and then measuring the number of atoms in an internal state chosen from among at least |a⟩ and |b⟩;

E: determining the Sagnac phase of said ultra-cold atoms and calculating the rotational velocity of said sensor along said measurement axis.

17. The measurement method according to claim 16, in order to measure a rotational velocity about the axis Z, wherein, during step C, said sequence includes applying, at certain times, a microwave signal formed by the superposition of a microwave signal at an angular frequency ωa and a microwave signal with an angular frequency ωb to one of the guides along X of the first pair, or applying a microwave signal formed by the superposition of a microwave signal at an angular frequency ωa' and a microwave signal with an angular frequency ωb' to one of the guides along Y' of the second pair.

18. The measurement method according to claim 16, in order to measure a rotational velocity about the axis X or the axis Y', wherein, during step C, said sequence includes:

in order to measure the rotational velocity about the axis X, applying, at certain times, a microwave signal formed by the superposition of a microwave signal at an angular frequency ωa and a microwave signal with an angular frequency ωb, simultaneously to the two guides along X of the first pair, in order to measure the rotational velocity about the axis Y', applying, at certain times, a microwave signal formed by the superposition of a microwave signal at an angular frequency ωa' and a microwave signal with an angular frequency ωb', simultaneously to the two guides along Y' of the second pair.

* * * * *